(12) United States Patent
Gage

(10) Patent No.: US 11,677,614 B2
(45) Date of Patent: Jun. 13, 2023

(54) METHOD AND APPARATUS FOR PROTECTING STATEFUL SERVICE FUNCTION PATHS

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 16/998,625

(22) Filed: Aug. 20, 2020

(65) Prior Publication Data
US 2022/0060370 A1   Feb. 24, 2022

(51) Int. Cl.
*H04L 12/24* (2006.01)
*H04L 41/0654* (2022.01)
*H04L 45/24* (2022.01)

(52) U.S. Cl.
CPC .......... *H04L 41/0654* (2013.01); *H04L 45/24* (2013.01)

(58) Field of Classification Search
CPC ......... H04L 45/64; H04L 67/10; H04L 69/22; H04L 45/306; H04L 45/28; H04L 45/38; H04L 47/125; H04L 41/0663
See application file for complete search history.

(56) References Cited

U.S. PATENT DOCUMENTS

| | | |
|---|---|---|
| 10,158,568 B2 | 12/2018 | Gage |
| 2016/0099867 A1 | 4/2016 | Guichard et al. |
| 2017/0111267 A1 | 4/2017 | Lin et al. |
| 2018/0013638 A1* | 1/2018 | Guichard ................ H04L 45/50 |
| 2018/0103091 A1* | 4/2018 | Kwak ..................... H04L 67/10 |
| 2019/0104076 A1* | 4/2019 | Seetharaman .......... H04L 47/17 |
| 2019/0230005 A1* | 7/2019 | Ao ........................... H04L 61/30 |
| 2021/0126831 A1* | 4/2021 | Filsfils ................ H04L 47/2441 |
| 2021/0126832 A1* | 4/2021 | Das ........................ H04L 41/20 |
| 2021/0273883 A1* | 9/2021 | Hu ........................ H04L 45/306 |

FOREIGN PATENT DOCUMENTS

| | | |
|---|---|---|
| CN | 104639414 A | 5/2015 |
| CN | 106330714 A | 1/2017 |
| CN | 106411553 A | 2/2017 |

(Continued)

OTHER PUBLICATIONS

P. Quinn, Ed. et al, Service Function Chaining (SFC) Architecture draft-quinn-sfc-arch-05.txt, Network Working Group Internet-Draft, May 5, 2014, 31 pages.

(Continued)

*Primary Examiner* — Romani Ohri

(57) ABSTRACT

A method, apparatus and system for providing stateful service function paths with redundancy are provided. Multiple instances of a service function path are included, each with at least one instance of a stateful service function. The redundant stateful service functions transmit messages between one another to so that the current state is synchronized. Upon failure of a service function in a first instance of the service function path, packets are redirected to a backup associated with the failed service function located in another instance of the service function path. Once processed by the backup service function, the redirected packets may be routed back to the first instance of the service function path.

15 Claims, 13 Drawing Sheets

(56) References Cited

FOREIGN PATENT DOCUMENTS

| CN | 108173759 A | 6/2018 |
|---|---|---|
| WO | 2016000513 A1 | 1/2016 |
| WO | 2016045710 A1 | 3/2016 |

OTHER PUBLICATIONS

IETF RFC 4364, "BGP/MPLS IP Virtual Private Networks (VPNs)", Feb. 2006.
IETF RFC 5880, "Bidirectional Forwarding Detection (BFD)", Jun. 2010.
IETF RFC 7665, "Service Function Chaining (SFC) Architecture", Oct. 2015.
IETF RFC 8200, "Internet Protocol, Version 6 (IPv6) Specification", Jul. 2017.
IETF RFC 8402, "Segment Routing Architecture", Jul. 2018.
IETF RFC 8655, "Deterministic Networking Architecture", Oct. 2019.
IETF RFC 8660, "Segment Routing with the MPLS Data Plane", Dec. 2019.
IETF RFC 8754, "IPv6 Segment Routing Header (SRH)", Mar. 2020.
IETF Draft RFC, "The IPv6 Compressed Routing Header (CRH)", May 14, 2020.
"3rd Generation Partnership Project; Technical Specification Group Services and System Aspects; System architecture for the 5G System (5GS); Stage 2"; 3GPP TS 23.501 V16.5.1 (Aug. 2020).
P. Quinn, Ed., et al., Network Service Header draft-ietf-sfc-nsh-02.txt, Jan. 19, 2016.
J. Halpern, Ed., et al., Internet Engineering Task Force (IETF) Service Function Chaining (SFC) Architecture RFC7665, Oct. 31, 2015.
International Search Report dated Apr. 27, 2017 for corresponding International Application No. PCT/CN2017/073220 filed Feb. 10, 2017.
IETF RFC 2827 Network Ingress Filtering: Defeating Denial of Service Attacks which employ IP Source 8 Address Spoofing. P. Ferguson et al. May 2000.
IETF RFC 4291 IP Version 6 Addressing Architecture. R. Hinden et al. Feb. 2006.
IETF RFC «draft» IPv6 Segment Routing Header (SRH). S. Previdi, Ed. et al. Mar. 18, 2016.
IETF Multi-Protocol Label Switching, «http://datatracker.ietf.org/wg/mpls/», Oct. 16, 2015.
IETF Service Function Chaining, «http://datatracker.ietf.org/wg/sfc/», Oct. 29, 2015.
Iternet Assigned Numbers Authority, "Protocol Numbers", «http://www.iana.org/assignments/protocol-18 numbers/», Jan. 31, 2017.
Internet Assigned Numbers Authority, "IPv6 Extension Header Types", «http://www.iana.org/assignments/ipv6-20 parameters/», Jan. 26, 2017.
IETF RFC «draft» IPv6 Service function Chain. C. Wang et al. Jan. 6, 2016.
NGMN Alliance, Peter Hedman, Ed., "Description of Network Slicing Concept", Jan. 2016.

\* cited by examiner

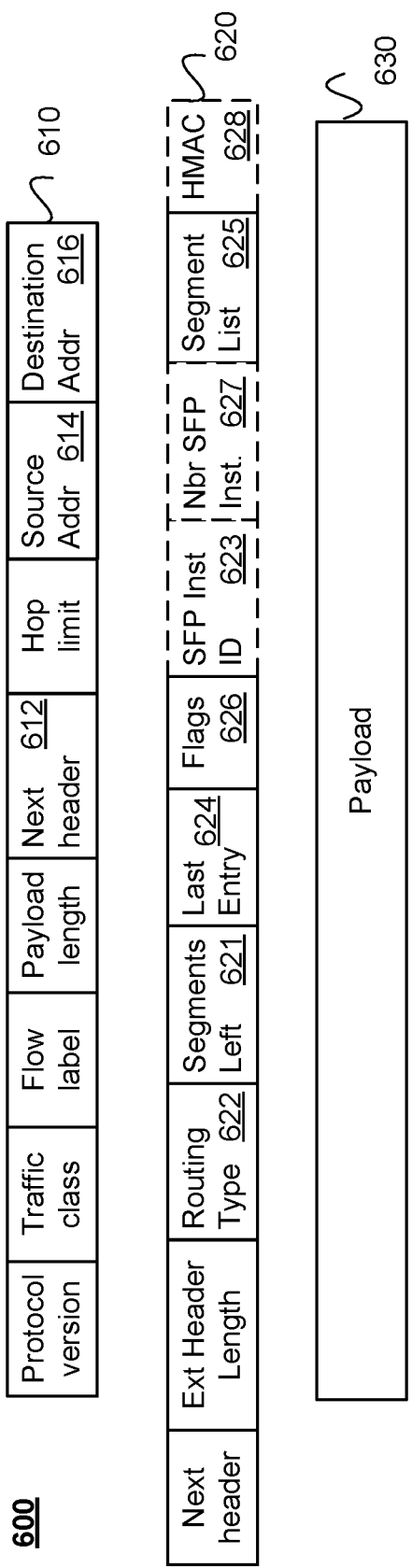
FIG. 6A
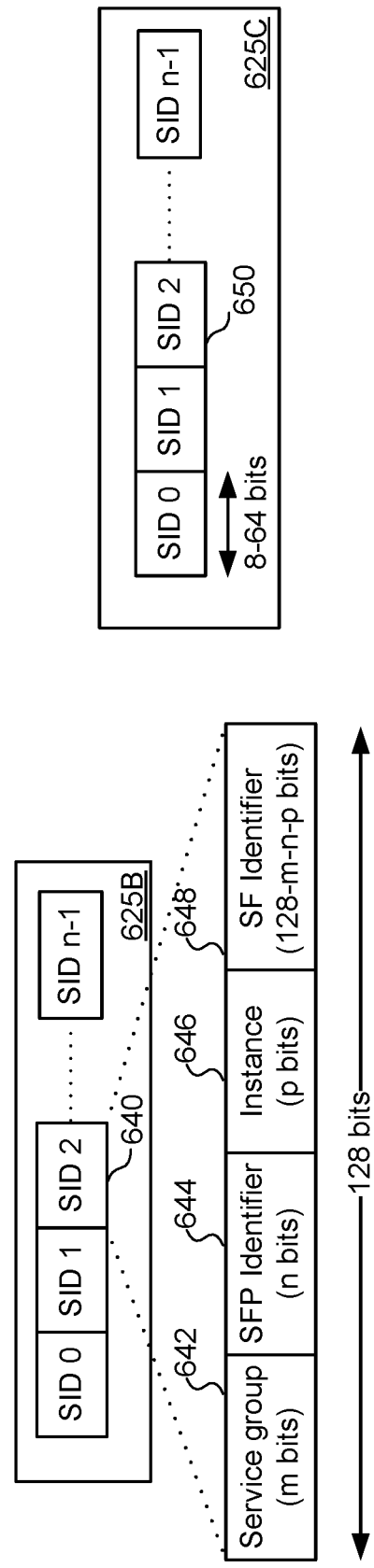
FIG. 6C
FIG. 6B

METHOD AND APPARATUS FOR PROTECTING STATEFUL SERVICE FUNCTION PATHS

CROSS REFERENCE TO RELATED APPLICATIONS

This is the first application for this invention.

FIELD OF THE INVENTION

The present invention pertains to the field of packet-based data communications and, in particular, to a method and apparatus for service function path protection through service domains.

BACKGROUND

In communication networks, service function chaining and service function forwarding can be used for forwarding packets along a predetermined service function path through the communication network. Internet Engineering Task Force (IETF) Request for Comments (RFC) document 7665, entitled "Service Function Chaining (SFC) Architecture," October 2015 and referred to herein as RFC 7665, describes various aspects of service function chains, service functions, service function paths, service function forwarders, and service nodes. According to RFC 7665, a service function chain (SFC) may define an ordered set of logical service functions and the ordering constraints that must be applied to packets or flows of packets (i.e. packet flows) traversing the SFC. The "chain" concept implies that a packet must be processed by one service function in the SFC before being processed, in sequence, by the next service function in the SFC. An SFC may also include classification criteria indicating which packets (or flow of packets (i.e. packet flows)) are to be processed by the SFC. Service function chaining may be used to implement crucial packet network operations such as traffic management, in-network content management, and network security. In addition, service function chaining may be used to customise packet network operations for specific customers or applications through network slicing.

According to RFC 7665, a service function (SF) is responsible for a specific treatment that is to be applied to received packets. A service function can act at various layers of a protocol stack (e.g. at one or more of the network (IP) layer, the transport (TCP/UDP) layer, the link layer, and the application layer). A service function may modify a received packet and/or may observe and record characteristics of a received packet. A specific service function may be incorporated into multiple service function chains. A service function node (SFN) is a physical network element hosting one or more service functions. Different service functions can co-exist on a specific service function node. Different instances of a specific service function can exist on different service function nodes in the same service domain.

A service function path (SFP) may be defined as a physical rendering of an SFC that indicates the sequence of network nodes or network functions and links that a packet will actually traverse in order to realise the processing defined by an SFC. Multiple SFPs may exist in a service domain and multiple instances of a specific SFP can exist in the same service domain. At each network node or network function along the SFP, a different service function can be applied to the packets.

In many cases, a service function must process a packet in a packet flow using information associated with previous packets in the packet flow. Information that must be retained for some time by a service function is referred to as packet flow-related SF state or SF state and the use of SF state to process a packet is referred to as stateful processing. Consequently, a service function that performs stateful processing of a packet flow is referred to as a stateful SF. If the network is unable to forward a packet to the SFN hosting a stateful SF, it may not be possible to process or forward further packets in the packet flow, resulting in a premature and unexpected loss of communications between the network end points exchanging information using that packet flow.

For critical communications, it is often necessary to identify alternate paths through the network and/or to instantiate redundant replicas of an SF or SFN to ensure that packets can be redirected to a backup instance of a SF if the path to the primary instance of a SF is lost. However, current solutions do not provide for an adequately effective solution for implementing both service function redundancy and stateful processing. Therefore, there is a need for a method and apparatus for service function path protection through service domains that also supports stateful processing, and that obviates or mitigates one or more limitations of the prior art.

SUMMARY OF THE INVENTION

An object of embodiments of the present invention is to provide a method, apparatus and system for providing stateful service function paths with protection against failures along a service function path. When a service domain must process high volumes of packets, the traffic associated with a service function chain (SFC) will typically be distributed over multiple instances of a replicated service function path (SFP) where each instance of the replicated SFP may have dedicated network resources related to its associated service functions (SFs) and service function nodes (SFNs). Therefore, each instance of the replicated SFP will be responsible for processing a subset of the packet flows assigned to the corresponding SFC in the service domain. The multiple SFP instances are utilised to provide multiple redundant service function paths, each with at least one stateful service function. The replicated stateful service functions transmit messages between each other to so that the current state of a packet flow associated with that service function is synchronized across all instances of the replicated service function. Upon failure of a service function in a first instance of the service function path, packets in an affected packet flow are redirected to a replica of the failed service function located in another instance of the service function path. Once processed by the replica of the service function, the redirected packets may be routed back to a subsequent service function on the first instance of the service function path.

In accordance with an aspect of the present invention, there is provided a method and apparatus for protecting a service function path. In accordance with embodiments of the present invention, there is provided a method for processing a packet flow in a service function path. The method includes receiving, by a network function, a first packet in a packet flow, the first packet including an indication identifying a primary SFP instance assigned to the packet flow, wherein the network function is associated with the primary SFP. The method further includes transmitting, by the network function, the first packet toward a primary second network function, the primary second network function associated with the primary SFP instance; and, in response to a communication failure with the primary second network function, transmitting, by the network function, a second packet in the packet flow toward a backup second network function associated with a second SFP instance, the second packet received, by the network function, subsequent to the first packet in the packet flow and including the indication identifying the primary SFP instance for the packet flow.

According to further aspects, the primary second network function updates a packet flow-related service function (SF) state associated with the packet flow according to the first packet. The primary second network function and the backup second network function are communicatively coupled to synchronize the packet flow-related SF state. In accordance with further aspects of the present invention, the backup second network function, following processing of the second packet, may transmit the second packet toward a primary third network function associated with the primary SFP instance according to the indication in the second packet identifying the primary SFP instance for the packet flow.

Furthermore, synchronizing the packet flow-related SF state associated with the packet flow includes determining, by the primary second network function, the second SFP instance associated with the backup second network function based on the indication identifying the primary SFP instance for the packet flow. The synchronizing further includes sending, by the primary second network function to the backup second network function, a state update message comprising the packet flow-related SF state associated with the packet flow.

According to a further aspect of the method, the state update message is transmitted in a state update packet. A destination address of the state update packet is a unicast address associated with the backup second network function and a source address of the state update packet is a unicast address associated with the primary second network function. The destination address includes an indication identifying the second SFP instance associated with the backup second network function and the source address including an indication identifying the primary SFP instance associated with the primary second network function. The further aspect of the method comprises: starting, by the primary second network function, a timer for monitoring reception of the state update message. The further aspect includes receiving, by the primary second network function, before expiry of the timer, a copy of the state update packet, in which the destination address associated with the copy of the state update packet is a unicast address including the SFP instance associated with the primary second network function. In the further aspect, the copy of the state update packet is received by the primary second network function due to forwarding of the state update message between members of an SF instance set, the SF instance set comprising at least the primary second network function and the backup second network function, and each member of the SF instance set is configured to forward a copy of the state update packet to a designated next member of the SF instance set, each member of the SF instance set associated with a different SFP instance.

The method further comprises including the indication identifying the primary SFP instance in a segment routing extension (SRE) associated with each of the first and second packets. The segment routing extension further comprises a segment list wherein the segment list comprises a list of segment identifiers (SIDs). Each SID is associated with a different respective one of a plurality of service functions forming the SFP. In accordance with further aspects of the present invention, each SID is an Internet Protocol (IP) address and the IP address includes the indication identifying the primary SFP instance. In accordance with further aspects of the present invention, the segment routing extension further comprises an indication of the number of members in the SF instance set.

In accordance with another aspect of the present invention, there is provided a network node comprising: a network interface; a processor; a first memory; and a non-transitory memory storing instructions. The network node is configured in the following manner, for example by execution of the instructions by the processor. The network node is configured to receive, using the network interface, a first packet in a packet flow, the first packet including an indication identifying a primary service function path (SFP) instance assigned to the packet flow, the network node being associated with the primary SFP instance. The network node is configured to transmit, using the network interface, the first packet toward a primary second network node, the primary second network node associated with the primary SFP instance. The network node is configured, in response to a communication failure with the primary second network node, to transmit, using the network interface, a second packet in the packet flow toward a backup second network node associated with a second instance of the SFP. The second packet is received, by the network node, subsequent to the first packet in the packet flow and including the indication identifying the primary SFP instance for the packet flow. The network node is further configured to update, in the first memory and according to the first packet, a packet flow-related service function (SF) state associated with the packet flow. The network node is further configured to transmit, using the network interface, a state update packet comprising the updated packet flow-related SF state, the state update packet including the indication identifying the primary SFP instance for the packet flow. The instructions further cause the network node to insert, into the destination address of the state update packet, a unicast network address associated with a backup network node configured as backup to the network node, the unicast network address including an indication identifying a backup SFP instance for the packet flow; and transmit, using the network interface, the state update packet to the backup network node.

In accordance with another aspect of the present invention, there is provided a network node comprising: a network interface; a processor; a first memory; and a non-transitory memory storing instructions that when executed by the processor cause the network node to: receive, using the network interface, a state update packet comprising a packet flow-related service function (SF) state associated with a packet flow, the state update packet including an indication identifying a primary service function path (SFP) instance associated with the packet flow, the network node forming part of an SFP instance other than the primary SFP instance for the packet flow; store, in the first memory and according to the primary SFP instance indicated in the state update packet, the packet flow-related SF state associated with the packet flow; and transmit, using the network interface, a copy of the state update packet, the copy of the state update packet including an indication identifying another SFP instance associated with the packet flow.

The instructions further cause the network node to receive, using the network interface, a packet associated with the packet flow, the packet including an indication identifying the primary service function path (SFP) instance associated with the packet flow; retrieve, from the first memory and according to the primary SFP instance indicated in the packet, the packet flow state associated with the packet flow; and transmit, using the network interface, the packet toward a further network node. In accordance with further aspects of the present invention, the further network node may be associated with the primary SFP instance indicated in the packet. The instructions further cause the network node to update, in the first memory and according to the packet, the packet flow-related SF state associated with the packet flow, and transmit, using the network interface, a second state update packet comprising the updated packet flow-related SF state associated with the packet flow.

Potential advantages of the present invention include providing redundancy without additional cost associated with dedicated backup links and network elements by having all of the components of an SFP actively processing traffic associated with their assigned packets flows while acting as backup for components of the SFP processing other packet flows.

Further advantages of the present invention include, obviating the need for pre-configuration and provisioning of dedicated backup components by having information conveyed in a segment routing extension (SRE) accompanying each packet in the packet flow to be used steering the packet toward (i.e., forwarding the packet to) the primary service function or backup service function.

Furthermore, in the event of a failure, re-routing decisions are made locally (i.e. by a network element associated with the service function) using information conveyed in the SRE accompanying each packet in the packet flow. Local re-routing decisions minimise the time required to recover from faults and minimise the disruption to affected packet flows.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 6A illustrates an encapsulation packet including an example segment routing extension, according to an embodiment of the present invention.

FIG. 6B illustrates a segment list of a segment routing extension with a structured IPv6 SID, according to an embodiment of the present invention.

FIG. 6C illustrates a segment list of a segment routing extension with a compact SID, according to an embodiment of the present invention.

It will be noted that throughout the appended drawings, like features are identified by like reference numerals.

DETAILED DESCRIPTION

Embodiments of the present invention generally provide apparatus, systems and methods for protecting a stateful service function path. In particular, embodiments of the present invention use multiple instances of a replicated service function path to redirect traffic to a replicated instance of a service function when there is a communication failure along the path to a service function. Each replica of the service function path may, for example, be instantiated to provide load balancing over the available network resources. A communication failure may correspond to a failed or unusable communication link, or a failed network node or component thereof.

Figure 1:
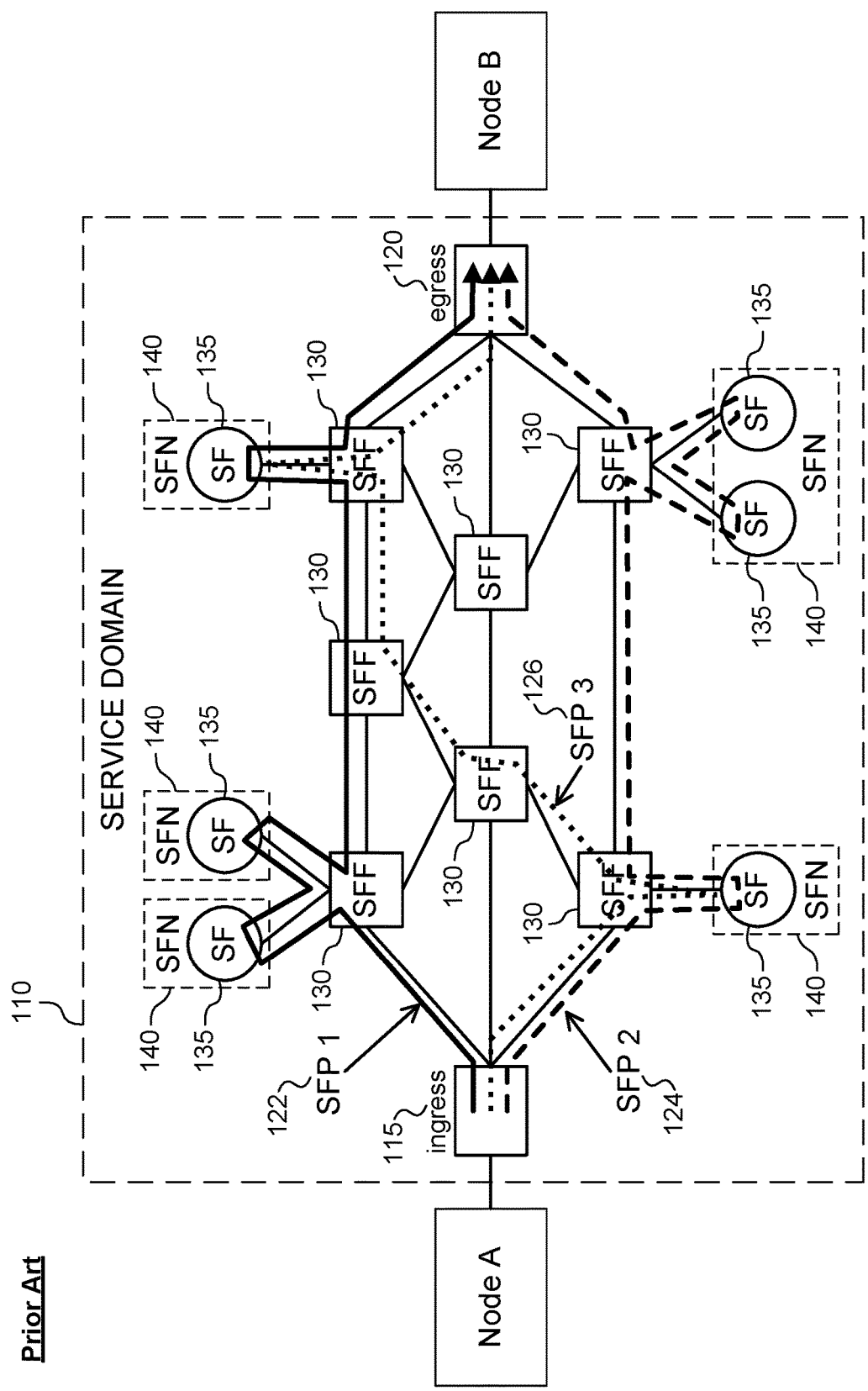
FIG. 1 illustrates prior art associated with service function paths in a service domain.

FIG. 1 illustrates a prior art service domain with service function paths implementing corresponding service function chains. As shown in FIG. 1, a user packet from a first network node, Node A, enters a service domain 110 via an ingress node (classifier) 115 and exits the service domain via an egress node 120, to be subsequently received at another network node, Node B. The user packet may be part of a packet flow comprising a sequence of user packets sent from Node A to Node B. Conventionally, a packet flow is identified by a 5-tuple in an Internet Protocol (IP) packet header consisting of IP protocol type, source IP address, destination IP address, source TCP/UDP port, and destination TCP/UDP port. In one embodiment, a plurality of packet flows can be processed within the service domain 110. In this embodiment, the ingress node 115 forwards packets associated with a particular packet flow along a particular SFP, such as SFP1 122, SFP2 124 or SFP3 126, according to a classification defining the set of service functions to be applied to the user packet. Accordingly, the ingress node 115 acts as a classifier node. Although in the simplified example of FIG. 1, there is a single ingress (classifier) node 115 and a single egress node 120, in other embodiments, there may be multiple ingress nodes 115 and multiple egress nodes 120 within a service domain. Additionally, a service domain 110 can contain more or fewer than the three service function paths (SFP1 122 (solid line), SFP2 124 (dashed line) and SFP3 126 (dotted line)) illustrated in FIG. 1.

Network nodes or network functions operating as service function forwarders (SFFs) 130 are responsible for forwarding traffic to connected service functions (SF) 135. The SFF 130 may be responsible for selecting routes and for forwarding or transmitting packets from a service function node (SFN) hosting one SF to the SFN hosting the next SF in a SFP. As illustrated in FIG. 1, a SFF 130 may be associated with zero, one or more SFNs 140 and may provide forwarding services to multiple SFPs within the service domain 110. In some embodiments, the network nodes or network functions operating as the SFF 130 may be incorporated into an SFN 140. Each SFF 130 can use information conveyed in a networking header associated with the packet to determine which, if any, connected SFs to send the packet to. When the SF 135 has finished processing the packet, the processed packet is returned to the SFF 130 which is further responsible for forwarding the packet to the next SFF or SFN. SFNs 140 can host one or more SFs 135 and can have one or more SFFs 130 associated with them.

Packet forwarding (i.e. forwarding of packets) between the SFs (or between the SFNs housing the SFs) may be performed by SFFs that may serve one or more instances of a SFP. Forwarding of packets between a SFF and SFN and between SFFs may, in turn, be performed by conventional packet forwarding network nodes or network functions within a routed network infrastructure.

A SF may be a virtual network function (VNF) that is instantiated using network function virtualization executing on a compute server, a stand-alone physical network device, or a resource of network device of a physical network element.

Further details in relation to the above definitions can be found, for example, in RFC 7665.

Figure 2:
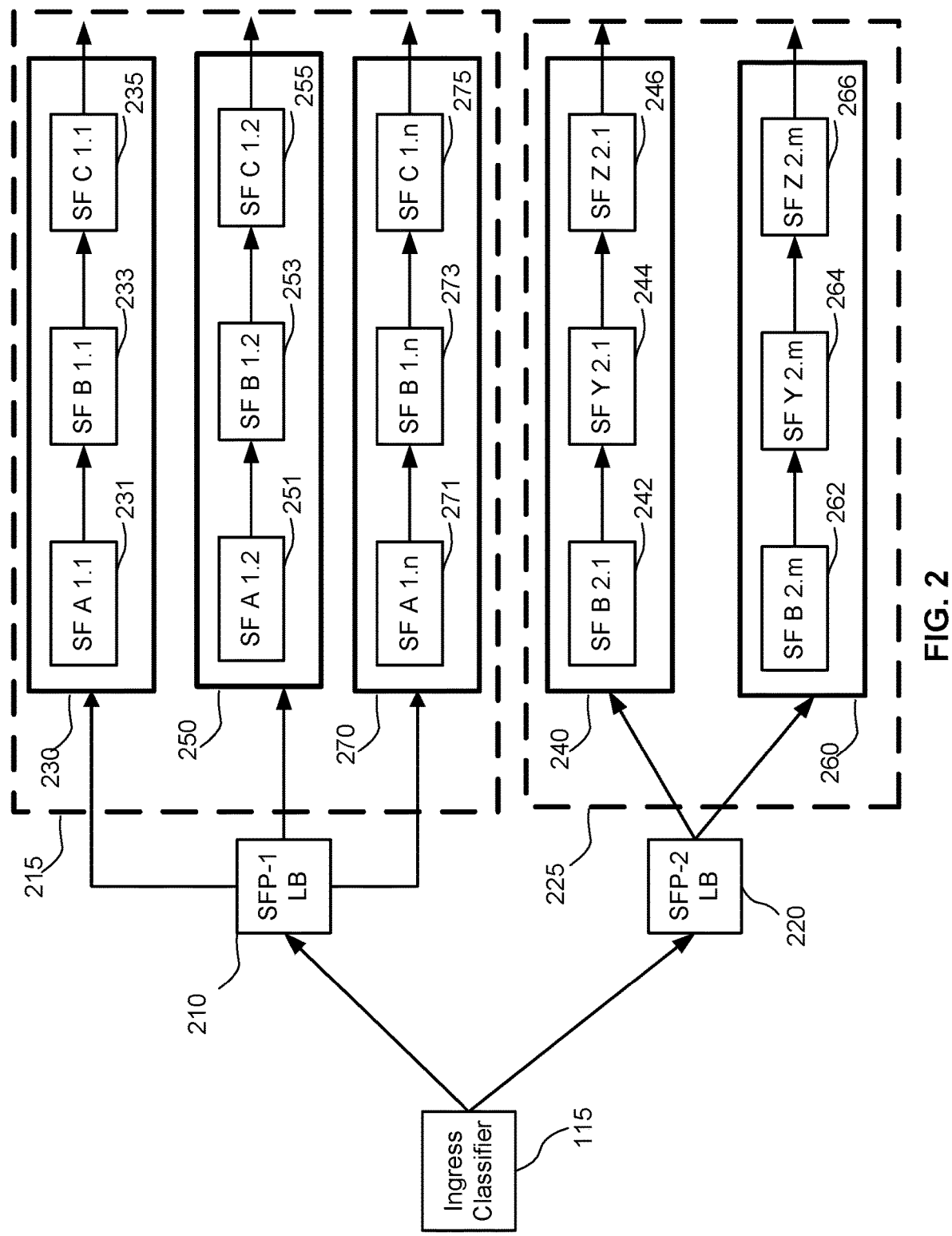
FIG. 2 illustrates distribution and balancing of packet flows over multiple instances of a service function path corresponding to a service function chain, according to an embodiment of the present invention.

Embodiments of the present invention provide for solutions for a protected service function path based on a distributed, local mechanism capable of restoring connectivity along a service function path following the failure of a network node or network function or link to said network node or network function. In one embodiment, the packet flows associated with a service function chain (SFC) may be distributed over multiple instances of a replicated service function path (SFP). Each instance of the SFP may have dedicated network resources related to its associated service functions (SFs) and service function nodes (SFNs). Therefore, each instance of the SFP will be responsible for processing a subset of the packet flows associated with a SFC in the service domain. FIG. 2 illustrates a distribution and balancing of packet flows over multiple instances of a SFP that corresponds to a SFC, according to this embodiment. To simplify the illustration, the SFN and SFF associated with a SF are not shown in this and the remaining figures included herein. As shown in FIG. 2, the ingress node 115 operates as a classifier and determines which SFC should be used to process an incoming user packet belonging to a packet flow. For the purposes of the following description, a primary SF instance refers to an instance of a SF in a primary SFP instance, a backup SF instance refers to an instance of a SF in an instance of a SFP that is not the primary SFP instance, and a primary SF instance and a backup SF instances constitute a SF instance set.

After processing an incoming user packet and identifying the SFC to be associated with the incoming user packet, the ingress node 115 forwards the user packet to a load balancer (LB) associated with the SFP corresponding to the selected SFC. In this example illustration, SFP-1 LB 210 corresponds to the load balancer associated with the SFP 215 corresponding to a first SFC and SFP-2 LB 220 corresponds to the load balancer associated with the SFP 225 corresponding to a second SFC. An operation of the ingress (classifier) node 115 for processing the incoming user packet will be described hereinafter with regards to FIG. 5. The load balancer receiving the user packet from the ingress (classifier) node 115 (i.e. SFP-1 LB 210 or SFP-2 LB 220) selects an instance of the associated SFP through which the user packet is steered (i.e. forwarded). For example, if the user packet is received at SFP-1 LB 210 and if the user packet is the first received user packet in the packet flow, the SFP-1 LB 210 may select an instance of the SFP 215 (e.g., SFP instance 230, SFP instance 250 or SFP instance 270) to process the packet flow. The instance of the SFP 215 selected by the SFP-1 LB 210 (e.g., SPF instance 230, SFP instance 250 or SFP instance 270) to process the packet flow is referred to as the primary SFP instance for that packet flow and the SFs in the primary SFP instance are referred to as the primary SF instances for that packet flow. The SFP instances 230, 250 and 270 are all instances of the SFP 215 and SFP instances 240 and 260 are instances of the SFP 225.

FIG. 2 presents the ingress (classifier) node 115 and the load balancer nodes SFP-1 LB 210 and SFP-2 LB 220 as distinct entities. Those skilled in the art will recognize such separation is for illustration only and the ingress (classifier) node can integrate functionalities of a load balancer. Embodiments of the present invention provide for the ingress (classifier) node to perform load balancing functions.

Within each SFP (e.g. SFP 215 and SFP 225), there are multiple replicas of a SF (i.e. multiple SF instances) which can be configured as backup SF instances for each other and the multiple SF instances with each SFP 215, 225 can be referred to as a SF instance set. As an example SF-A in SFP 215 has "n" SF instances (SF-A1.1 231, SF-A1.2 251 to SF-A1.$n$ 271) forming a SF instance set associated with SF-A, SF-B has "n" SF instances (SF-B1.1 233, SF-B1.2 253 to SF-B1.$n$ 273) forming another SF instance set associated with SF-B and similarly, SF-C has "n" SF instances (SF-C1.1 235, SF-C1.2 255 to SF-C1.$n$ 275) forming also another SF instance set associated with SF-C. Although FIG. 2 shows only three SFs per SFP (e.g. SF-A, SF-B and SF-C), it can be understood the number of SFs per SFP is only dependent on the SFC associated with a packet flow, and this number is provided just for illustration purposes, without any limitation.

A stateful SF appearing in different SFPs may generate different packet flow state information, therefore SF instances in another SFP (e.g. SF-B 2.1 242 and SF-B 2.$m$ 262 in SFP 225) cannot be included in a SF instance set associated with SFP 215. For a particular packet flow, the SF instance within a SF instance set that is associated with the primary SFP instance may be designated as the primary SF instance for that packet flow and the other SFs within the SF instance set may operate as backup SF instances for that packet flow. The network nodes or network functions associated with the SF instances within the primary SFP instance are referred to as primary network nodes or network functions. Likewise, network nodes or network functions associated with the backup SF instances are referred to as backup network nodes or network functions.

It is noted that a SF instance set can also be configured in other ways. One or more SF instances may operate as primary SF instances, and one or more other SF instances may operate as backup SF instances. A SF instance can operate solely as a primary SF instance, solely as a backup SF instance, or as both a primary and a backup SF instance. A backup SF instance can operate as a backup for at least one specified or unspecified other SF instance, which may itself be a primary SF instance or another backup SF instance. A SF instance may be designated as a backup SF instance relative to another SF instance, and also (possibly) as a primary SF instance relative to one or more backup SF instances. Primary and backup SF instances may be organized with respect to each other in one or more loops, a tree, or a combination thereof.

The load balancer may be configured to cause all user packets in a particular packet flow to be forwarded to the same instance of the SFP (i.e., SPF instance). In an embodiment, an indication identifying the SFP instance assigned to the packet flow is provided by conveying an identity of the selected SFP instance along with the user packet within the service domain. The selection of an SFP instance amongst available SFP instances may be based on load balancing criteria such as round-robin method, least recently used method or other methods best suited for the particular situation. If SFP-1 LB 210 selects SFP instance 230 to process the packet flow, the SFP-1 LB 210 will forward an encapsulation packet to the SF-A1.1 231 which is the first SF along the selected primary SFP instance 230. In absence of SF instance failures as described elsewhere herein, the SF-A1.1 231 may be configured to forward the received encapsulation packet to subsequent SFs along the selected SFP instance 230 (e.g. SF-B1.1 233 and eventually to SF-C1.1 235). The operation of the load balancer and the service function nodes and a description of an encapsulation packet according to embodiments of the present invention will be described hereinafter.

Figure 3:
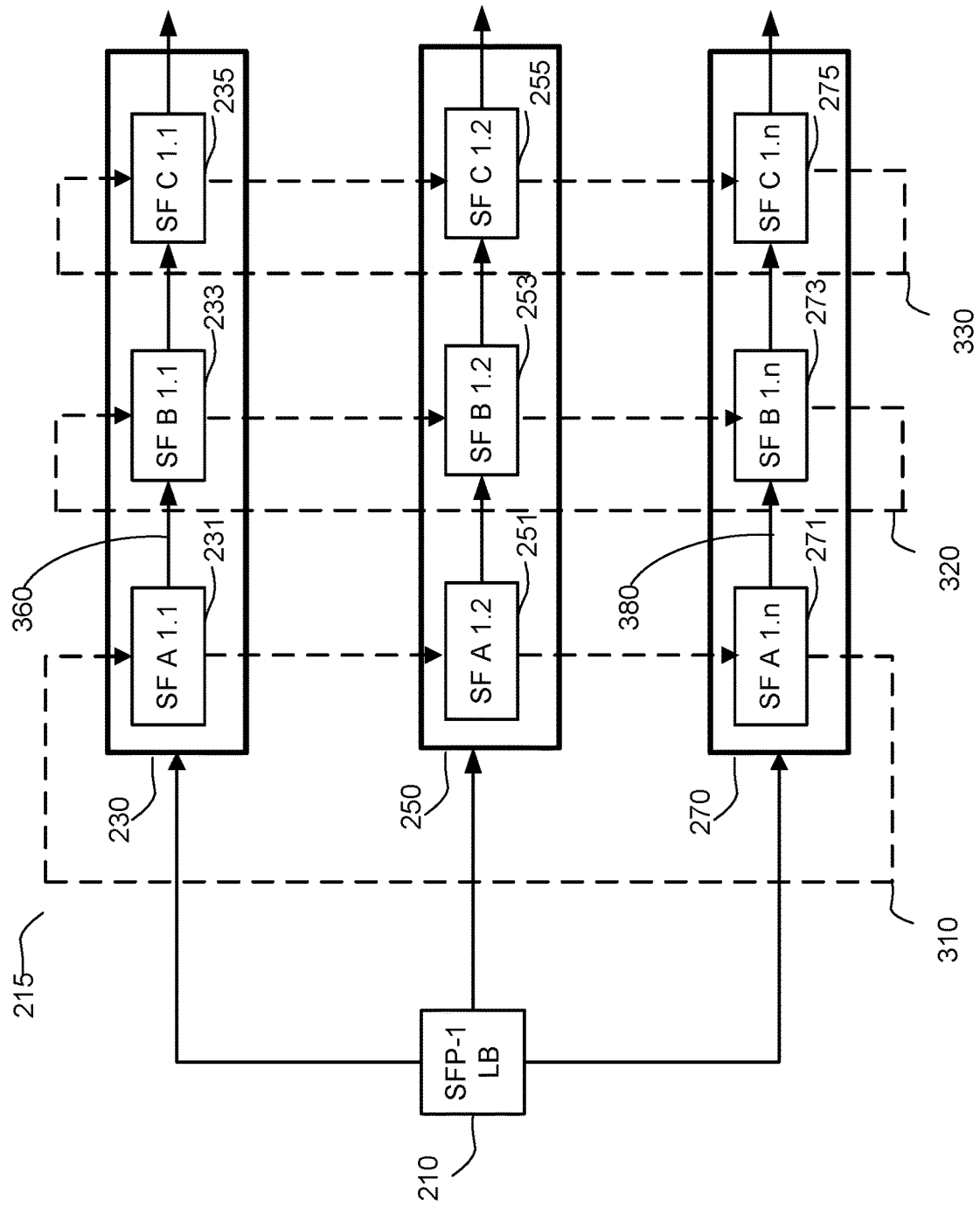
FIG. 3 illustrates packet and state forwarding over multiple service function paths, according to an embodiment of the present invention.

Embodiments of the present invention route user plane traffic around a communication failure along the path to a next SF by using a backup instance of the next SF. According to some such embodiments, for a particular SF in the associated SFC, each instance of a SF within a replicated SFP operates as the backup for other instances of the SF within the same SFP. For example, if there are n instances of a SFP in a service domain, then for a particular SF in the associated SFC, there may be one (1) primary SF for a packet flow and (n−1) backup SFs for that packet flow. In other embodiments, a different arrangement of primary and backup SFs may be used. In order to operate as a backup SF instance, and to replace a primary SF instance in the event of a failure, each instance of a SF stores its own SF state as well as the (n−1) SF states associated with other instances of the SF in the SFP. Referring back to FIG. 2, each of the SF instances of the SF instance set associated with SF A (e.g. SF-A1.1 231, SF-A1.2 251 to SF-A1.n 271) operates as backup SF instance to the remaining (n−1) SFs that form the SF instance set for SF-A in SFP 215. Additionally, to allow for stateful processing of user packets, even after a SF failure, each backup instance of the SF locally stores a synchronized copy of the packet flow-related SF state stored at the primary SF instance. Local storage may refer to storage of SF state in a locally accessible (e.g. located in the same device or in the same rack or datacenter, depending on context) electronic memory. FIG. 3 illustrates packet and state forwarding over multiple instances of a service function path, according to an embodiment of the present invention. A synchronized copy of the SF state is maintained at each backup SF instance.

In some embodiments, an encapsulation packet may be redirected to a backup instance of the next SF upon detection of a failure. In other embodiments, an encapsulation packet may be redirected to multiple backup instances of a next SF, for example including a primary backup instance of the next SF and a secondary backup instance of the next SF, or multiple backup instances of the next SF. This may be the case for example when a timing-critical user packet is being processed and a low failure rate is desired.

Referring now to FIG. 3, when the processing of a user packet induces a change in the SF state associated with a packet flow assigned to a primary SF instance, the primary SF instance forwards the updated SF state (or at least the SF state associated with that packet flow) to the other (backup) instances of the SF. For example, in SFP 215, when the primary SF-A 1.1 231 updates its SF state during the processing of a user packet in an assigned packet flow, a copy of the updated SF state for that packet flow is propagated to all of the corresponding backup SFs in the SF instance set associated with SF-A, namely to SF-A1.2 251 through to SF-A1.n 271 as indicated by the state synchronisation path 310. At each subsequent SF, SF-B1.1 233 and SF-C 1.1 235 of SFP instance 230, an SF state change (i.e. an indication of a change to SF state) may be similarly propagated to backup SF instances in the SF instance sets associated with SF-B and SF-C, respectively, as indicated by state synchronisation path 320 and 330, respectively. However, it is noted that, in various other embodiments, not all of the SFs are necessarily stateful SFs. In cases where the SF is not stateful, no propagation of SF state is required.

According to these embodiments, each of the backup SF instances within SFP instances 250 and 270 stores the packet flow-related SF state provided by the primary SF instance within the primary SFP 230 without needing to repeat the processing of user packets performed by the primary SF instance. As a consequence, a SF may use a deterministic or non-deterministic process because the results of a non-deterministic process will be captured in the packet flow-related SF state and the synchronized copy maintained at each backup SF instance.

In some embodiments, the primary SF instance (e.g. SF-A 1.1 231) may send a unicast packet containing the updated SF state to each backup SF instance (e.g. to SF-A 1.2 251 and to SF-A 1.n 271). In other embodiments, a multicast packet may be used to distribute the updated SF state to all backup SF instances associated with a multicast tree rooted in the primary SF instance (e.g. SF-A1.1 231). Alternatively, a SF state update process may be used to propagate the SF state along a path (e.g. a loop) such as state synchronisation path 310. Such a SF state update process will be described with regards to FIGS. 9 and 10. The SF state update process may be considered "circular" in the sense that the SF state is propagated along a closed path which begins and ends at a same node.

Figure 4:
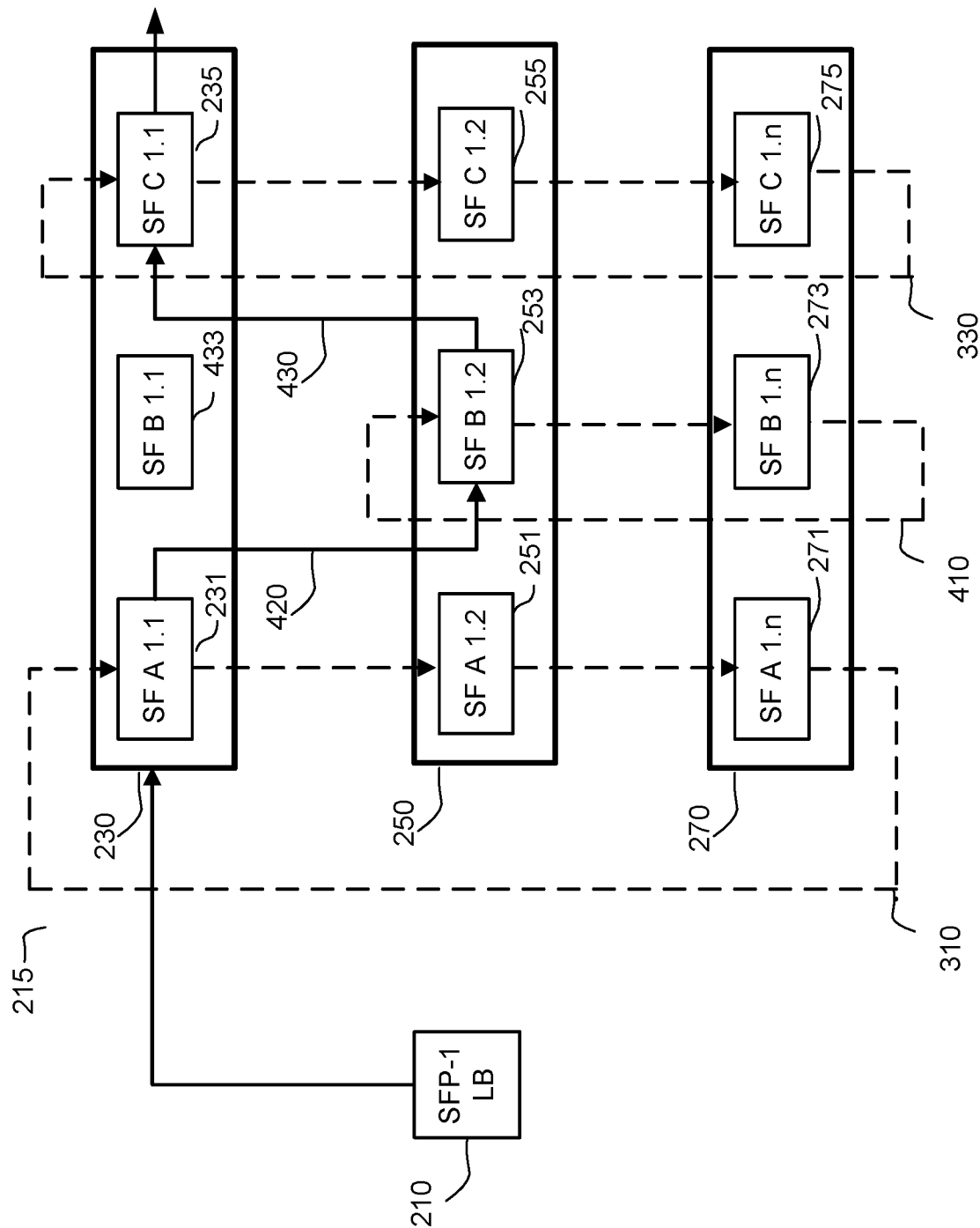
FIG. 4 illustrates packet rerouting through a backup SF of the service function path, according to an embodiment of the present invention.

FIG. 4 illustrates an operation for rerouting an encapsulation packet upon a communication failure along the path to a primary SF instance according to embodiments of the present invention. For simplicity only SFP 215 is shown in FIG. 4. According to embodiments of the present invention, a primary SF instance (e.g. SF-A1.1 231), after receiving and processing a user packet, generates an encapsulation packet for transmission to the next SF in the primary SFP instance 230 for the packet flow (e.g. to SF-B1.1 233); the generation of the encapsulation packet will be discussed with regards to FIG. 5. The primary SF instance (SF-A1.1 231) also updates the packet flow-related SF state if the user packet processing induced a state change and then propagates the packet flow-related SF state change to the (n−1) backup SF instances in the SF instance set associated with SF-A (e.g. SF-A1.2 251 to SF-A1.*n* 271), as disclosed above. Upon detection of a communication failure on the path to the next primary SF instance in the primary SFP instance 230, or a failure of the next SF primary instance itself (e.g. failed SF-B1.1 433), a rerouting function is used to redirect the encapsulation packet to a backup SF instance of the next primary SF instance (e.g. SF-B1.1 433) such as SF-B 1.2 253. The rerouting function may be affiliated with a SF 135 or may be affiliated with a network element associated with a SF such as an SFN 140 or SFF 130; the rerouting function may also be affiliated with a load balancer such as SFP-1 LB 210. Other implementations of the rerouting function are possible without departing from the scope of this invention. The communication failure may be detected by an adjacent network element such as the SFN 140 or SFF 130 associated with a SF 135, such as SF-A1.1 231 based, for example, on a liveness check such as bidirectional forwarding detection. The failure may be detected prior to forwarding the encapsulation packet or upon detecting a failed attempt to forward the encapsulation packet to the SF instance (e.g. to SF-B 1.1 433). Other methods for detecting a path failure are well known to those skilled in the art and can be used to detect a path failure to a SF in a SFP instance.

The rerouting function, in this embodiment, may further modify a header of the encapsulation packet to include the address of the backup SF instance (e.g. SF-B 1.2 253) of the next primary SF instance (e.g. SF-B 1.1 433) in a destination address field of the encapsulation packet. The rerouting function can then forward the encapsulation packet to the backup SF instance (SF-B 1.2 253), as indicated by backup forwarding path 420.

According to embodiments of the present invention, the rerouting function may be configured to provide the destination address of the backup SF instance (SF-B1.2 253) to a SFF 130 or SFN 140 for insertion into the packet header of the encapsulation packet.

The backup SF instance (SF-B1.2 253), upon receiving the encapsulation packet through the backup forwarding path 420, processes the user packet using the packet flow-related SF state previously received from the primary SF instance (SF-B 1.1 233 in FIG. 3). If the processed user packet induces a packet flow-related SF state change (i.e. a change to the SF state associated with the packet flow that includes the user packet), the backup SF instance (SF B1.2 253) forwards the updated SF state associated with that packet flow to the remaining backup SF instances of the SF instance set associated with SF-B within the SFP 215, as indicated by the state synchronisation path 410. As shown, the state synchronisation path 410 excludes the failed SF (SF-B 1.1 433) due to failure of the path to this node or of the node itself. However, if the primary SF instance (SF-B 1.1 433) is able to communicate for the purposes of SF state updating, the state synchronisation path 410 may alternatively include or attempt to include the primary SF instance (SF-B 1.1 433).

Embodiments of the present invention provide for the user packet at the backup SF instance (SF-B1.2 253) to be forwarded to the next SF in the primary SFP instance assigned to the packet flow (e.g. SF-C1.1 235) as indicated by the backup forwarding link 430. A route restoration function affiliated with the backup SF instance or with an SFN 140 or SFF 130 associated with the backup SF instance (SF-B1.2 253) restores the path through the primary SFP instance 230 by steering the encapsulation packet towards (i.e. forwarding the encapsulation packet to) the next SF in the primary SFP instance (i.e. SFC1.1 235). For this purpose, the encapsulation packet may include an indication of its associated primary SFP instance. The next SF in the primary SFP instance (SF-C 1.1 235) may, if required, synchronize its SF state through state synchronisation path 330.

Figure 5:
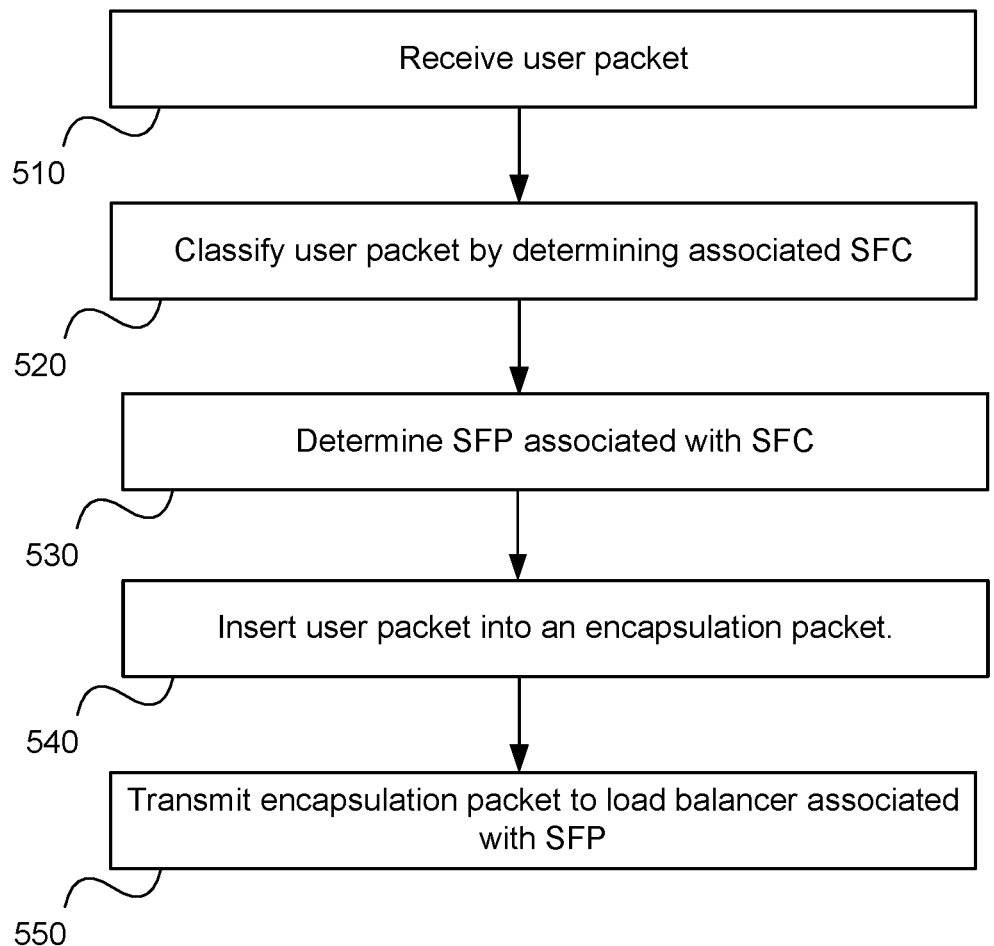
FIG. 5 illustrates an operation of an ingress classifier, according to an embodiment of the present invention.

FIG. 5 illustrates a method for user packet processing 500 at an ingress (classifier) node such as ingress (classifier) node 115 according to embodiments of the present invention. The ingress (classifier) node, after receiving an incoming user packet at step 510, classifies the user packet by determining which SFC to associate to the incoming user packet at step 520. At step 530, the ingress (classifier) node determines the SFP associated with the SFC where the SFP comprises a sequence of SFs to use for processing the incoming user packet, the incoming user packet being a user packet in an identified packet flow. All user packets from the identified packet flow are, in the present embodiment, associated with the same SFP. The SFP can be represented as [SF-A, SF-B, SF-C] using the example of FIG. 2 which denotes the sequence of SFs to be applied to all user packets in the identified packet flow. At step 540, the ingress (classifier) node inserts the incoming user packet, including the header and the payload of the user packet, into an encapsulation packet. At step 550, the ingress (classifier) node transmits the encapsulation packet to the load balancer associated with the SFP, such as LB 210 associated with SFP 215.

The encapsulation packet will be described with reference to FIGS. 6A, 6B and 6C. According to embodiments of the present invention, the encapsulation packet 600 may use an augmented version of the segment routing header defined for segment routing over IPv6, referred to herein as SRv6; other embodiments, such as those using Multi-Protocol Label Switching (MPLS), may also be used without departing from the scope of the present invention. A conventional SRv6 segment routing header is described in IETF RFC 8754 entitled "IPv6 Segment Routing Header (SRH)". In an example embodiment utilizing IPv6 and segment routing, the encapsulation packet 600 comprises an IPv6 header 610 and a segment routing extension (SRE) 620 that is inserted between the IPv6 header 610 and a payload 630 of the encapsulation packet 600. In some embodiments, the user packet to be processed by SFs in the SFP is included in the payload 630 of the encapsulation packet 600. The IPv6 header 610 of the encapsulation packet 600 includes a destination network address field 616, a source network address field 614 and a "next header" field 612, amongst other fields as shown in FIG. 6A. The existence of the segment routing extension (SRE) 620 is indicated by the "next header" field 612 in the IPv6 header 610.

The fields of the SRE 620 include a "routing type" field 622 indicating the fields and format of the segment routing extension 620, a segment list field 625 containing a list of path segments that are to be traversed by the encapsulation packet 600, a "last entry" field 624 indicating the number of entries in the segment list 625, and a "segments left" field 621 indicating the number of segments in the segment list 625 that have not been traversed so far in the forwarding path. The ingress (classifier) node 115, according to embodiments of the present invention, sets the "segments left" field 621 (and the "last entry" field 624) to (n−1) where n is the number of segments in the segment list 625.

The fields of the SRE 620 may further include a "flags" field 626 indicating optional aspects of the SRE 620 and a "metadata" field (not shown) containing information that may be used in the processing of the SRE 620 and the segment list field 625.

The segment list field 625 contains a list of path segments that are to be traversed by the encapsulation packet 600. Each entry of the segment list field 625 contains a segment identifier (SID) that may be used by a SFF 130 to identify a path to a SF 135 or to an SFN 140. Embodiments of the present invention provide for the list of path segments to be a reverse-ordered list—i.e. the first entry in the list of path segments contains a SID that identifies the last path segment and the last entry in the list of path segments contains a SID that identifies the first path segment. In these embodiments the list of path segments would represent the SFC [SF-A, SF-B, SF-C] as (SF-C, SF-B, SF-A). Other ordering methods of the entries in the list of path segments can be used without departing from the scope of the present invention. In some embodiments, the user packet includes an IPv6 header 610 and the SRE 620 is inserted after the IPv6 header 610 of the user packet. In such embodiments, the encapsulation packet 600 is the user packet with a SRE 620 after the IPv6 header 610 of the user packet. The destination address field 616 in the IPv6 header 610 of the user packet received by the ingress node 115 is inserted as a SID in the last entry of the segment list field 625—(DA, SF-C, SF-B, SF-A)—and is restored to the destination address field 616 of the user packet by the egress node 120.

Embodiments of the present invention provide for the SRE 620 to include a hashed message authentication code (HMAC) field 628 for protecting the segment list field 625 and, in some embodiments, other fields of the SRE 620. Such protection is provided by using cryptographic keying material that may not be known to the load balancer but is known by the ingress (classifier) node 115 and by network elements of the SFP (e.g. SF 135, SFN 140 or SFF 130). The HMAC 628 may be computed by the ingress (classifier) node 115 and may be validated by network elements of a SFP (e.g. SF 135, SFN 140 or SFF 130) using a pre-shared cryptographic key and a pre-determined cryptographic hashing algorithm.

According to embodiments of the present invention, the SRE 620 may include a field to identify the SFP instance selected to process the identified packet flow. The "SFP instance identifier" field 623 in the SRE 620 can be provided as an indication of the primary SFP instance assigned to the identified packet flow by a load balancer (such as LB 210). The current number of instances of this SFP in the service domain may also be indicated by a field in the SRE 620 represented as the "number of SFP instances" field 627. The existence of the SFP instance identifier field 623 and the number of SFP instances field 627 may be indicated by the "routing type" field 622 or by entries in the "flags" field 626 of the SRE 620.

According to certain embodiments of the present invention, a SID in the list of path segments contained in a segment list 625 may be encoded as a 128-bit IPv6 address associated with a SF within the SFP assigned to the identified packet flow. FIG. 6B shows a structured IPv6 address 640 used as a SID within a segment list field 625B. Use of the structured IPv6 address 640 as a SID within a segment list field 625B allows service function forwarding along a SFP using conventional IP routers within a service domain. As shown in FIG. 6B, the structured IPv6 address 640 may include: a service group field 642 used, for example, to indicate that the address is being used for service function chaining in order to distinguish it from IPv6 addresses used for other purposes (e.g. for use as an end point address); a SFP identifier field 644 used, for example, to indicate the SFC or SFP associated with the SID; an instance field 646 to indicate the primary instance of a protected SFP (i.e. SFP instance) associated with the SID; and a SF identifier field 648 to indicate the SF associated with the SID. In some embodiments, the SF identifier 648 is unique only or at least within the context of the SFP identifier; in other embodiments, the SF identifier may be unique within the context of the service domain.

In alternative embodiments of the present invention, a SID in the list of path segments contained in the segment list field 625 may be encoded as a compact SID in a compressed segment routing extension. FIG. 6C shows a compact SID 650 in a list of path segments contained in a segment list field 625C. For example, a compact SID 650 may be an 8-bit to 64-bit token associated with the corresponding SF within the SFP. The SF token may be assigned, for example, by a management plane entity. The SF token may be unique at least within the context of the SFP or it may be unique within the context of the service domain. A SFF 130 or a SFN 140 may, for example, use the token to access a look-up table where information is stored to indicate how the encapsulation packet 600 is to be forwarded to the associated SF.

Referring back to step 540 of FIG. 5, the ingress (classifier) node 115 inserts the incoming user packet into the payload 630 of an encapsulation packet 600 with an IPv6 header 610 and a SRE 620 as depicted in FIG. 6A. The source address field 614 is set to an address associated with the ingress (classifier) node 115, and the destination address field 616 is set to an address of the load balancer, such as SFP-1 LB 210, associated with the SFP corresponding to the selected SFC.

Embodiments of the present invention provide for the ingress (classifier) node (such as ingress classifier 115) to provide the SRE 620 without identifying the SFP instance to be used within the corresponding SFP. In these embodiments the SFP instance will be inserted into the SRE 620 by the load balancer following selection or identification of the SFP instance associated with the identified packet flow. In embodiments that include the SFP instance identifier field 623 in the SRE 620, the ingress (classifier) node 115 initialises the SFP instance 623 (e.g. sets I=0). In embodiments that do not include the SFP instance identifier field 623 and where each SID in the list of path segments contained in the segment list field 625B is a structured IPv6 address 640, the ingress (classifier) node 115 initialises the SFP instance field 646 in each SID (e.g. sets I=0). The ingress (classifier) node 115 then sets the list of path segments contained in the segment list field 625 to indicate the sequence of SFs in the SFP (e.g. (SF-C, SF-B, SF-A)) and sets the last entry field 624 and the segments left field 621 to indicate the number of SIDs in the list of path segments contained in the segment list field 625 (e.g. in the example of FIG. 2, SL=(3−1)=2). These values of the source address field 614, the destination address field 616, the information elements of the SRE 620 are represented in Table 1 to indicate the IPv6 header 610 and the SRE 620 in the encapsulation packet conveying a user packet from the ingress (classifier) node 115 to the SFP-1 LB 210 in FIG. 2.

TABLE 1

| source address | destination address | SRE information elements |
| --- | --- | --- |
| Ingress (classifier) node | SFP-1 LB | I = 0; (SF-C, SF-B, SF-A); SL = 2 |

Figure 7:
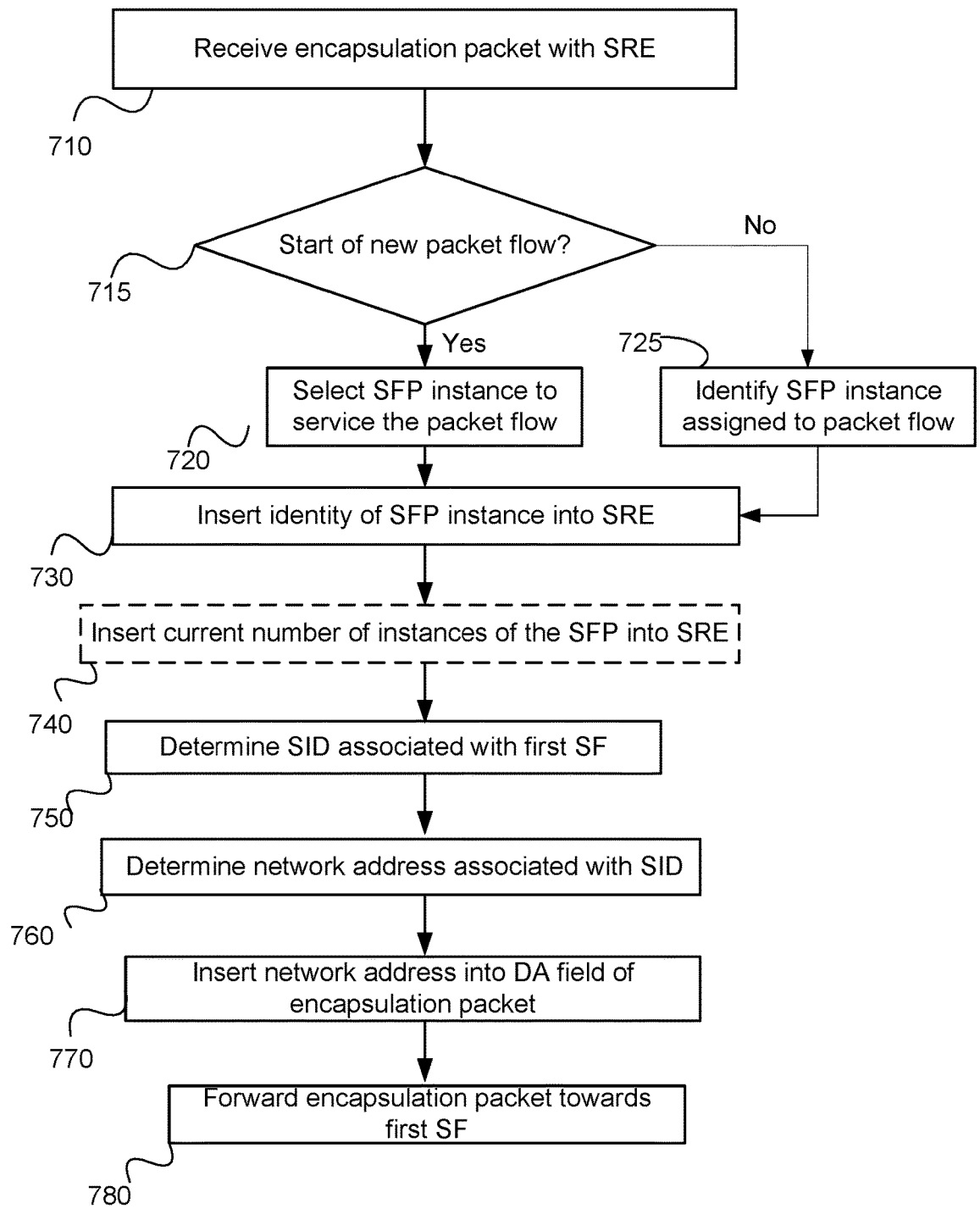
FIG. 7 illustrates an operation performed by a load balancer, according to an embodiment of the present invention.

FIG. 7 illustrates an operation 700 performed by a load balancer such as the SFP-1 LB 210 according to embodiments of the present invention. The steps of the operation 700 are provided in this order for illustration purpose but the order could be changed or some steps performed concurrently without departing from the scope of the present invention. At step 710, an encapsulation packet 600, having an IPv6 header 610 and an SRE 620, is received at the load balancer. At step 715, the load balancer determines whether the user packet in the payload 630 of the encapsulation packet 600 represents the start of a new packet flow based, for example, on information in the header of the user packet. If the user packet represents the start of a new packet flow, an instance of the SFP is selected at step 720 to service the packet flow. Otherwise, if the user packet does not represent the start of a new packet flow, the load balancer determines the instance of the SFP currently assigned to the packet flow at step 725. The SFP instance identified in step 720 or in step 725 is deemed to be the primary SFP instance for the identified packet flow.

According to certain embodiments of the present invention, at step 730, the identity of the primary SFP instance (I) may be inserted into an optional field 623 of the SRE 620 of the encapsulation packet 600; in the example of FIG. 3, I=1. According to other embodiments of the present invention, at step 730, the identity of the primary SFP instance (I) may be inserted into the SFP instance field 646 of each SID 640 used as structured IPv6 address in the list of path segments contained in the segment list field 625B.

According to certain embodiments of the present invention, at step 740, the load balancer may insert the current number of instances of this SFP into an optional field 627 in the SRE 620 if the SFP instances may be dynamically provisioned in the service domain, for example, to reflect the projected load of the SFP.

At step 750, the SID associated with the first SF in the SFP is determined as indicated by the current value of the "segments left" field 621 of the SRE 620; in the example of Table 1, the list of path segments in the segment list field 625 indexed with SL=2 refers to the SID associated with SF-A.

At step 760, the network address associated with the first SF in the primary SFP instance is determined. In the embodiments where a SID is a structured IPv6 address 640, the SID associated with the first SF is used directly as the IP address affiliated with the first SF in the primary SFP instance. In the embodiments where a SID is a compact SID 650, a look-up table may be used to map the compact SID 650 associated with the first SF to a network (e.g. IP) address affiliated with the first SF in the primary SFP instance. If necessary, the identity of the primary SFP instance (I) may be inserted into the instance identifier field 646 of the IP address 640.

At step 770, the network address determined at step 760 is inserted into the destination address field 616 of the encapsulation packet 600. At step 780, the encapsulation packet is forwarded towards the first SF in the primary instance of the SFP. In the example of FIG. 3, the values of the source address field 614 and the destination address field 616 in the IPv6 header 610 and the information elements of the SRE 620 of the encapsulation packet 600 conveying the user packet from the load balancer SFP-1 LB 210 to the first SF (SF-A 1.1 231) of SFP instance 230 are shown in Table 2.

TABLE 2

| source address | destination address | SRE information elements |
|---|---|---|
| SFP-1 LB | SF-A 1.1 | I = 1; (SF-C1.1, SF-B1.1, SF-A1.1); SL = 2 |

Figure 8:
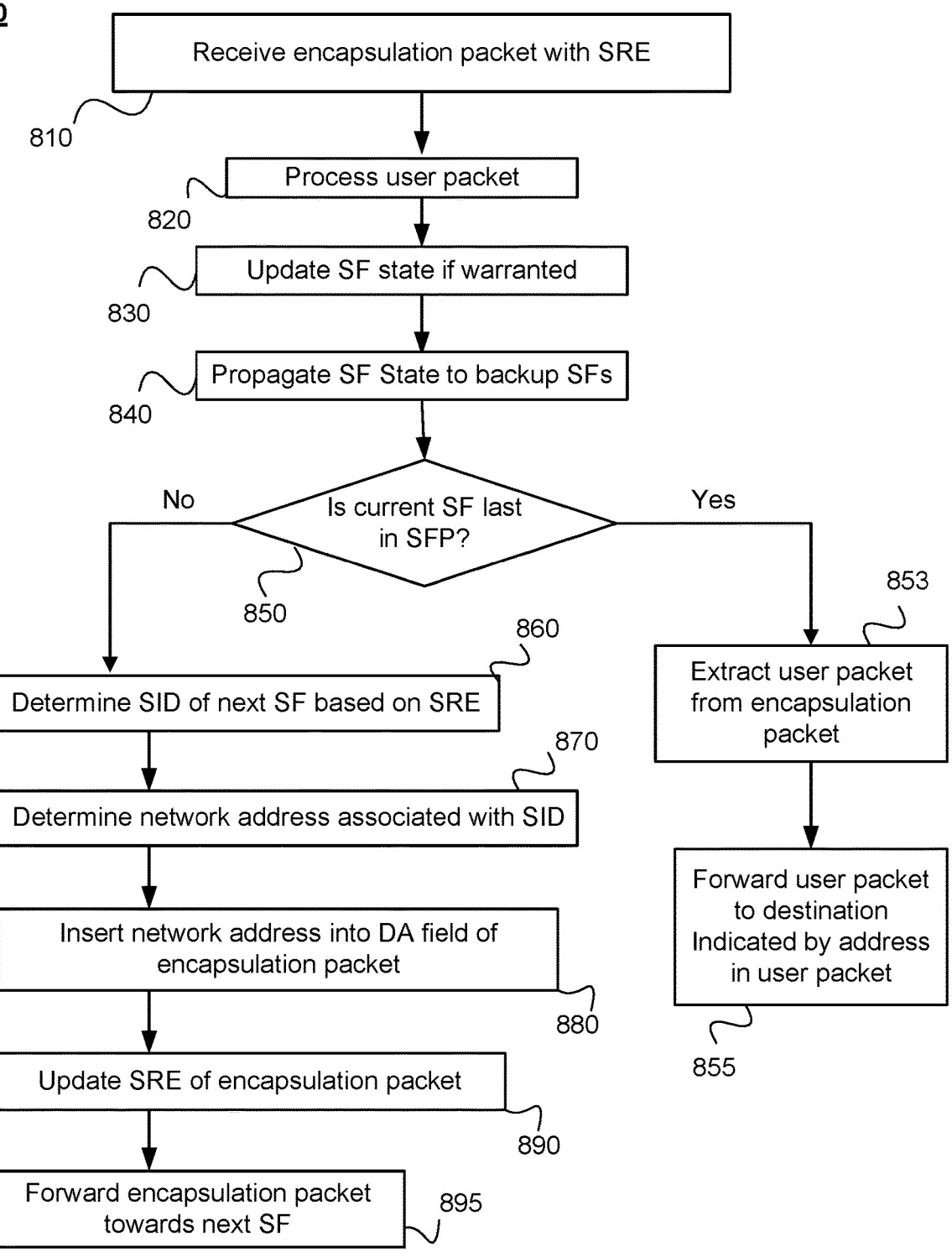
FIG. 8 illustrates an operation performed at a service function, a service function node, or a service function forwarder, according to an embodiment of the present invention.

FIG. 8 shows an operation 800 performed at a SF and at a SF node or SFF associated with the SF within a SFP instance of a service domain according to embodiments of the present invention. The steps of the operation 800 are provided in this order for illustration purpose but the order could be changed or some steps performed concurrently without departing from the scope of the present invention. After receiving an encapsulation packet 600 at step 810, the user packet in the payload 630 of the encapsulation packet 600 is processed by the SF instance at step 820. At step 830, the packet flow-related SF state is updated if the processing at step 820 induced any SF state change. At step 840, if the packet flow-related SF state is updated in step 830, the updated SF state is propagated to backup SF instances of the SF instance as described below. Following on the example of FIG. 3, the processing of the received user packet at SF-A 1.1 231 when inducing SF state change, will cause the SF state to be updated and propagated to the backup SF instances, namely SF-A 1.2 251 and SF-A 1.3 271.

At step 850 a test is performed to determine if the current SF is the last SF in the SFP. That determination may be based on the value of the SRE "segments left" field 621 in SRE 620. Embodiments of the present invention provide for the value of the SRE "segments left" field 621 to be decremented following processing of the user packet at each SF along the SFP. When the received value of the SRE "segments left" field 621 is equal to zero (0), this indicates that the current SF is the last SF in the SFP as depicted by the "Yes" branch of step 850.

If the current SF is the last SF in the SFP then, at step 853, the SFN or SFF associated with the last SF extracts the user packet from the payload 630 of the encapsulation packet 600 and, at step 855, forwards the user packet towards a destination node indicated by a destination address field in a header of the user packet.

If the current SF is not the last SF in the SFP (i.e. the received value of the SRE "segments left" field 621 is not equal to zero) then, at step 860, following the "No" branch of step 850, the SFN or SFF associated with the SF instance determines the SID associated with the next SF in the SFP based on the value of the "segments left" field 621 in the SRE 620. According to certain embodiments of the present invention, an updated value of the SRE "segments left" field 621 is obtained by decrementing by 1 from the value of the SRE "segments left" field 621 in the encapsulation packet 600 received at step 810. Following on the example in Table 2, the value of the SRE "segments left" field received by SF-A 1.1 231 is SL=2 and the updated value is SL=1. The next SF from SF-A 1.1 231 is determined by indexing the SRE "segment list" field 625 with SL=1 which refers to the SID of SF-B 1.1233.

At step 870, the network address associated with the next SF instance (i.e. SF-B 1.1 233) is determined. As described previously, in the embodiments where a SID is a structured IPv6 address 640, the SID associated with the next SF is used directly as the network address associated with the next SF instance. In the embodiments where a SID is a compact SID 650, a look-up table may be used to map the compact SID 650 associated with the next SF to a network address associated with the next SF instance. At step 880, the determined network address is inserted into the destination address field 616 of the encapsulation packet 600. At step 890, the SRE "segments left" field 621 of the encapsulation packet 600 is updated with the new value (SL=1). At step 895, the updated encapsulation packet 600 is forwarded towards the next SF instance (i.e. SF-B 1.1 233). In the example of FIG. 3, the values of the source address field 614 and the destination address field 616 in the IPv6 header 610 and the information elements in the SRE 620 of the encapsulation packet 600 conveying the user packet from SF-A 1.1 231 to SF-B 1.1 233 are shown in Table 3.

TABLE 3

| source address | destination address | SRE information elements |
|---|---|---|
| SF-A1.1 | SF-B 1.1 | I = 1; (SF-C1.1, SF-B1.1, SF-A1.1); SL = 1 |

The operation 800 when performed at SF-B 1.1 233 will result in a modified encapsulation packet 600 being forwarded to SF-C 1.1 235. In the example of FIG. 3, the values in the source address field 614 and the destination address field 616 of the IPv6 header 610 and the information elements of SRE 620 of the encapsulation packet are shown in Table 4.

TABLE 4

| source address | destination address | SRE information elements |
|---|---|---|
| SF-B 1.1 | SF-C 1.1 | I = 1; (SF-C1.1, SF-B1.1, SF-A1.1); SL = 0 |

Performance of the operation 800 at the last SF instance in the SFP (i.e. SF-C 1.1 235) with the received SRE "segments left" field 621 value equal to zero (SL=0) will lead to the "Yes" branch of step 850 as described above. The steps of operation 800 does not establish any sequential order of operation but is for illustration purposes only. Those skilled in the art will know that the order of steps illustrated can be changed and some steps or actions may be performed concurrently without affecting the working of the invention.

In the operation 800 described above, the SF state update (also referred to as a state update message, which may be transmitted in a state update packet) is propagated to other SF instances in the SF instance set in step 840, prior to forwarding of the user or encapsulation packet 600. However, some embodiments of the present invention provide for the SF state update to be propagated after forwarding the encapsulation packet 600 (i.e. after step 895) or after forwarding the user packet (i.e. after step 855). Those skilled in the art will recognize that propagating the SF state update can be performed prior to or after the forwarding step without departing from the principle or scope of the present invention.

Embodiments of the present invention provide for a SF instance to propagate SF state change (i.e. an indication of a change to SF state) or updated SF state to its backup SF instances. According to embodiments of the present invention, the backup SF instances of a SF instance set are configured to cooperatively synchronize packet flow-related SF state whenever processing of a user packet by a SF instance induces a packet flow-related state change.

According to embodiments of the present invention, maintenance of SF state can be handled by backup SF instances of the SF instance set without actually processing the user packets that constitute an identified packet flow.

According to certain embodiments, a SF state change (i.e. an indication of a change to SF state) may be sent as a unicast packet to each SF instance of a SF instance set that is configured as a backup SF instance to the primary SF instance. The unicast packet may have a destination network address associated with the backup SF instance and an indication identifying the SFP instance associated with the backup SF instance. The source address of the unicast packet may be associated with the primary SF instance with an indication of the primary SFP instance associated with the primary SF instance. For example, the destination network address and the source network address of the unicast packet may each be a structured IPv6 address 640 with an SF instance identifier field 646. Alternatively, a multicast (or broadcast) packet may be used to transmit the SF state change to all the backup SF instances. In other embodiments, a state packet may be a unicast packet with an SRE 620 where the list of backup SF instances is included in the SRE segment list field 625.

Figure 9:
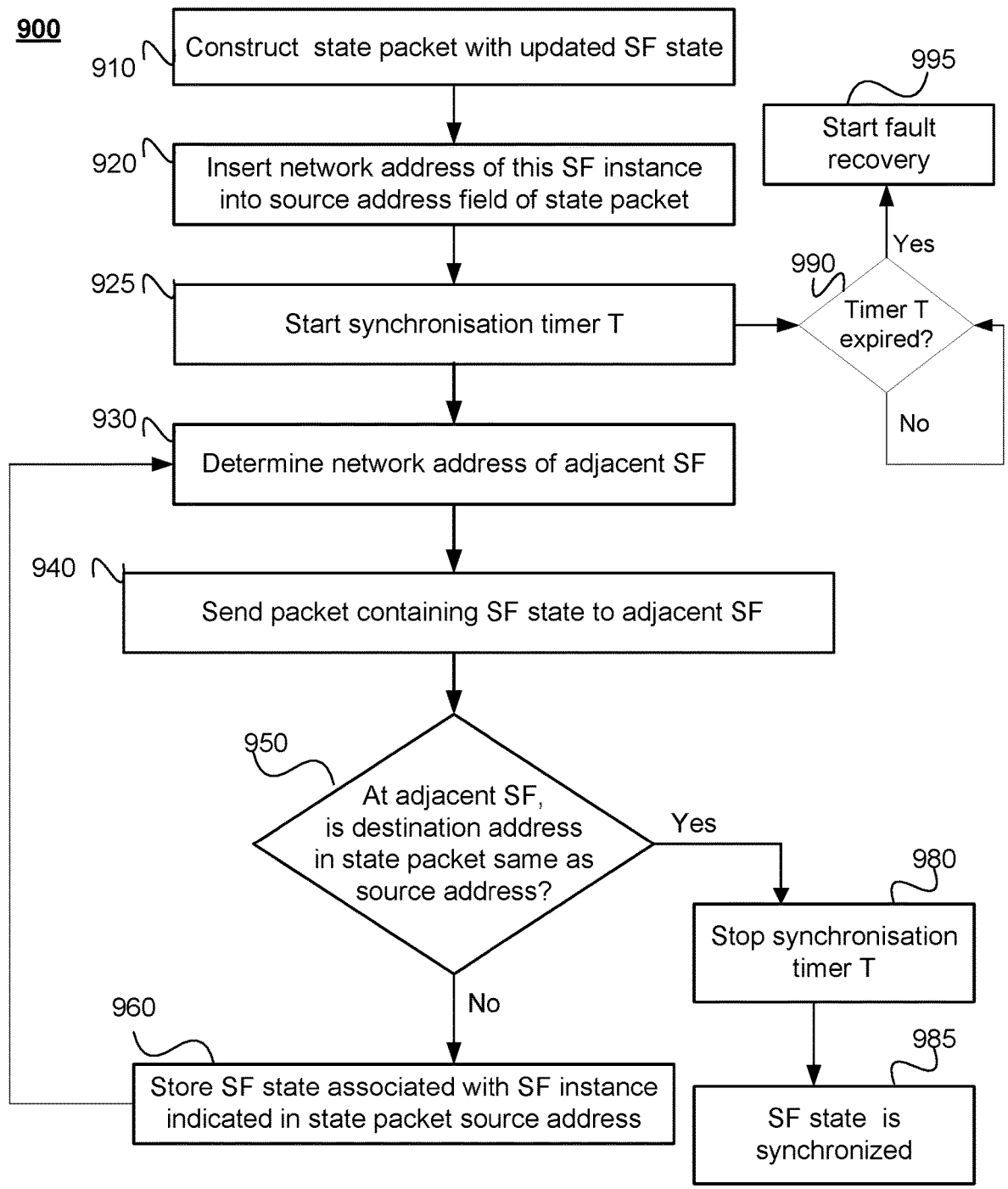
FIG. 9 illustrates a circular SF state propagation method, according to an embodiment of the present invention.

According to other embodiments, a SF state propagation method may be used in which a packet containing a SF state change (i.e. an indication of a change to SF state) is sent sequentially from one SF instance to another SF instance in a SF instance set. According to embodiments of the present invention, each SF instance may be configured (e.g. by a management function) with the identity of another SF instance to which SF state is to be sent. According to other embodiments of the present invention, SF state may be propagated from one SF instance to another in a circular fashion. FIG. 9 illustrates such a circular SF state propagation method, represented as operation 900. The steps of the operation 900 are provided in this order for illustration purpose but the order could be changed or some steps performed concurrently without departing from the scope of the present invention. In step 910, an originating SF instance that needs to propagate its SF state generates a state packet that is a unicast packet containing an indication of the SF state and, in step 920, inserts its network address into the source address field of the state packet. According to certain embodiments of the present invention, the network address of the originating SF instance is a structured IPv6 address 640 with a SFP instance identifier field 646 and the originating SF instance in SFP instance k inserts the value k into the SFP instance identifier field 646 of the state packet source address 614. At step 925, the originating SF instance starts a synchronisation timer T.

At step 930, a SF generates the network address associated with the SF instance in an adjacent SFP instance. According to certain embodiments of the present invention, the network address associated with the SF instance in an adjacent SFP instance is a structured IPv6 address 640 with a SFP instance identifier field 646 and the SF instance sets the SFP instance identifier field 646 of the state packet destination address 614 to the value $I_{OUT}$ based on the instance modulo operation: $I_{OUT} (I_{IN}+1) \bmod(n)$ where n is the number of SFP instances in the service domain and $I_{IN}$ is the value of the SFP instance identifier field 646 in the destination address 614 of the state packet received by the SF instance; at the originating SF instance, $I_{IN}$=k. In some embodiments, the value of n may be pre-configured into the SF instance (e.g. by a management function). In other embodiments, the value of n may be determined from a "number of SFP instances" field 627 in the SRE 620 of an encapsulation packet 600. At step 940, the generated network address is inserted into the destination address field 616 of the state packet and the state packet is forwarded to the adjacent SF instance.

At step 950, a SF instance receiving a state packet determines whether the destination address 616 in the state packet is the same as the source address 614 in the state packet. If they are the same, indicating that the state packet has been returned to the SF instance that originated the state packet in step 920, the "Yes" branch from step 950 is followed. At step 980, the originating SF instance stops the synchronisation timer T and, in step 985, deems the SF state to be synchronised with other SF instances in the SF instance set.

If the destination address 616 in the state packet is not the same as the source address 614 in the state packet, the "No" branch from step 950 is followed. At step 960, the backup instance of the SF stores the SF state associated with the SF instance indicated by the SFP instance identifier field 646 of the state packet source address 614. The backup instance of the SF instance continues the operation 900 at step 930.

At step 990, the originating SF instance determines whether the synchronisation timer T has expired. If the synchronisation timer T expires before the originating SF instance receives a copy of its SF state packet, the "Yes" branch from step 990 is followed indicating that the SF state synchronization across the SF instance set has not succeeded and fault recovery procedures may be initiated at step 995. Such fault recovery procedures can include the originating SF instance resending the SF state packet according to operation 900 or other recovery procedures known to those skilled in the art can be used.

Figure 10:
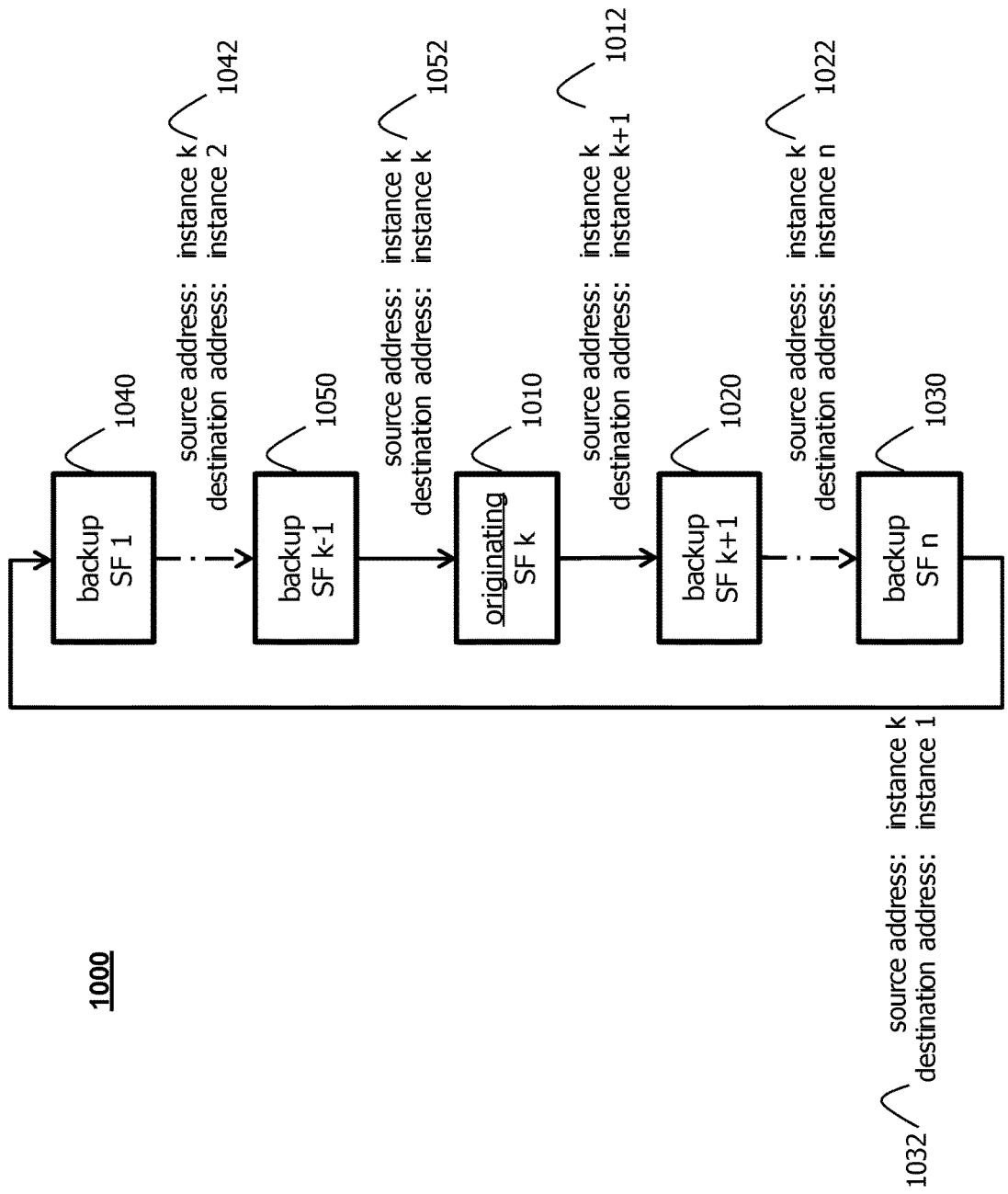
FIG. 10 illustrates a SF state operation, according to an embodiment of the present invention.

FIG. 10 illustrates a SF state propagation operation 1000 using a structured IPv6 address 640 with an SF instance identifier field 646. The steps of the SF state propagation operation 1000 are provided in this order for illustration purpose but the order could be changed or some steps performed concurrently without departing from the scope of the present invention. The originating SF instance 1010, associated with SFP instance k, generates a state packet 1012 for forwarding to a backup SF instance 1020 associated with SFP instance k+1; the SF instance identifier of the state packet 1012 source address is set to k and the SF instance identifier of the state packet 1012 destination address is set to k+1. The state packet is propagated through subsequent backup instances of the SF with each backup instance of the SF incrementing the SF instance identifier field 646 in the state packet destination address and leaving the state packet 1012 source address unmodified. Eventually a SF 1030, associated with the last SFP instance n, receives a copy of the state packet 1022 where the SF instance identifier of the state packet 1022 source address is set to k and the SF instance identifier of the state packet 1022 destination address is set to n. Backup SF instance n 1030 modifies the state packet 1032 so that the SF instance identifier of the state packet destination address is set to 1 according to the modulo addition operation described in step 930 of operation 900. The state packet 1032 is received by the backup SF instance 1040 associated with SFP instance 1. The state packet 1042 is forwarded by the backup SF instance 1040 with the SF instance identifier of the state packet 1042 destination address incremented to 2. The state packet 1042 is propagated through subsequent backup instances of the SF, with each backup instance of the SF incrementing the SF instance identifier field 646 in the state packet destination address, until it is received by the SF 1050 associated with SFP instance k−1. Backup SF instance k−1 1050 forwards a modified state packet 1052 where the SF instance identifier of the state packet 1052 destination address is incremented to k and the SF instance identifier of the unmodified source address of the state packet 1052 is also set to k. When the state packet 1052 is received by the originating SF instance 1010, the originating SF instance 1010 recognises the matching source and destination addresses, indicting successful propagation of the state packet through the SF instance set.

Figure 11:
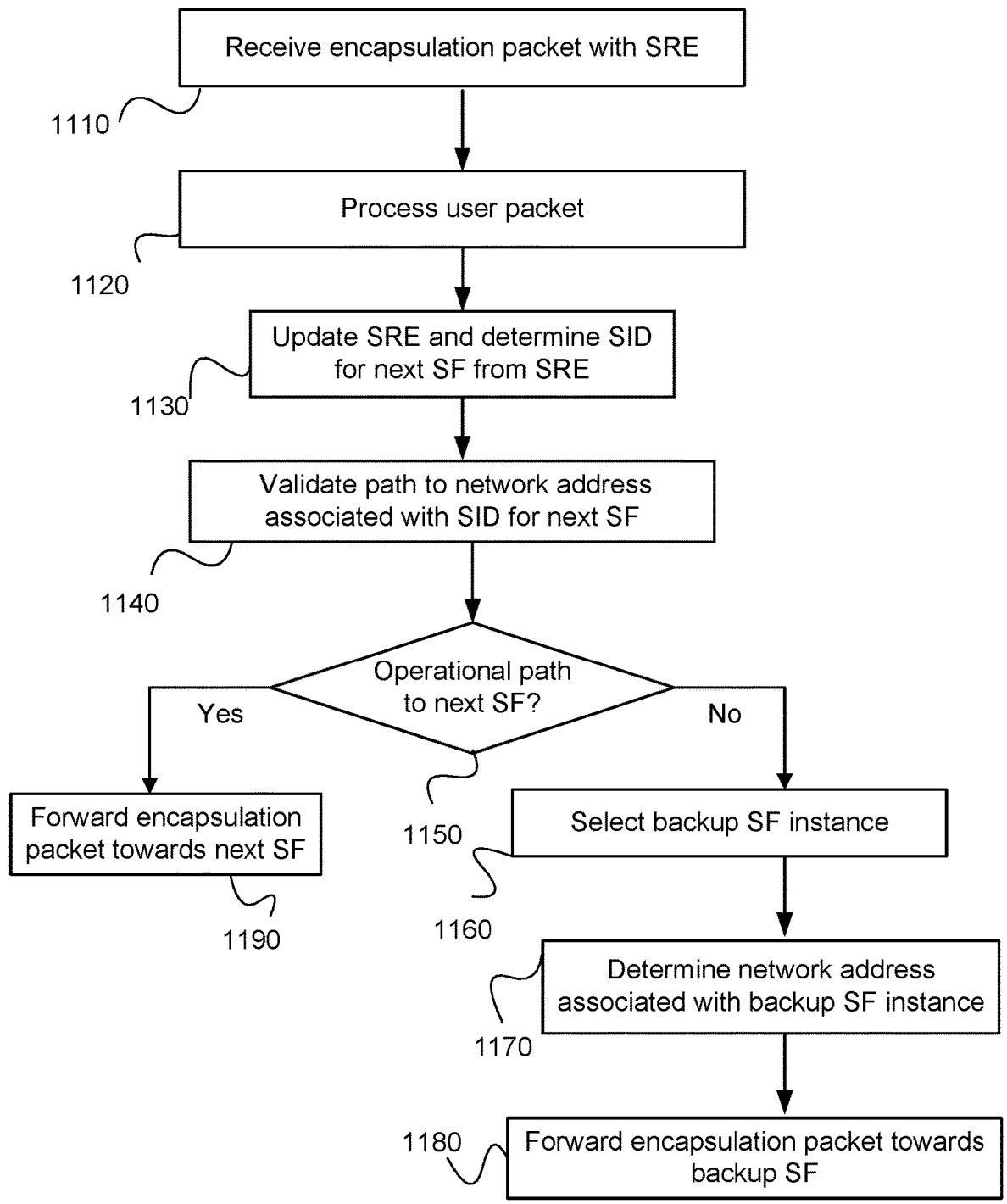
FIG. 11 illustrates the redirection of a packet after a communication failure, according to an embodiment of the present invention.

FIG. 11 illustrates an operation 1100 to reroute a packet around a communication failure along the path to a next SF instance. Steps of the operation 1100 may be performed by a single entity or by a combination of entities such as the SF, the SFF or SFN and a rerouting function (RRF). The steps of the operation 1100 are provided in this order for illustration purpose but the order could be changed or some steps performed concurrently without departing from the scope of the present invention. Operation 1100 will be described following the example of FIG. 4 in which a network entity affiliated with SF-A 1.1 231 detects a communication failure along the path towards SF-B 1.1 433 and redirects a packet toward the backup instance SF-B 1.2 253.

At step 1110, an encapsulation packet 600 with an SRE 620 is received at a SF instance (e.g. SF-A 1.1 231). At step 1120, the user packet in the payload 630 of the encapsulation packet 600 is processed according to embodiments of the present invention, for example to process the user packet according to the service function (SF-A1.1 231) and, if necessary, to propagate an updated SF state to backup SF instances in the SF instance set. At step 1130, the SRE 620 in the encapsulation packet 600 is used to identify the SID associated with the next SF in the SFP. At step 1140, the network address associated with the SID is determined and a check is performed to ensure that there is an operational path to the network address associated with the next SF in the SFP instance. If there is an operational path to the next SF in the SFP instance, the "Yes" branch of step 1150 is followed and, at step 1190, the encapsulation packet is forwarded towards the network address associated with the next SF in the SFP instance.

If there is no operational path to the next SF in the SFP instance, the "No" branch of step 1150 is followed and, at step 1160, a rerouting function (RRF) determines a backup SF instance in another instance of the SFP. According to embodiments of the present invention, and following the example of FIG. 4, an RRF may be affiliated with an SFN 140 or SFF 130 associated with a SF 135 such as SF-A 1.1 231; an RRF may also be affiliated with a load balancer such as SFP-1 LB 210. According to an embodiment of the present invention, an RRF may select the backup SF instance of the failed SF instance in order to distribute the processing load of the failed SF instance over the remaining SF instances. The RRF may, for example, select a backup SF instance randomly, or in a round-robin fashion, or according to the current load in each of the backup SF instances.

For example, the RRF may select a number m (1≤m<n) and derive the backup SF instance (b) as a modulo operation such as b=(k+m)mod(n), where n is the number of SFP instances in the service domain (e.g. as indicated by a "number of SFP instances" field 627 in the SRE 620). In the example of FIG. 4, if m=1 then b=2 and the backup SF instance is SF-B 1.2 253. According to other embodiments of the present invention, the RRF may be pre-configured, by a management function for example, with the backup SF instance (b) to use in the event of a communication failure.

At step 1170, the RRF determines the network address associated with the backup SF instance b either by inserting b into the SFP instance identifier field 646 when using a structured IPv6 address 640 as a SID to obtain the network address associated with backup SF instance b, or by accessing a look-up table entry associated with the backup SF instance b when using a compact SID 650 as described above. At step 1180, the RRF inserts the resolved IP address of the backup SF instance b (i.e. SF-B 1.2 253) into the destination address field of the encapsulation packet 600 and then transmits the encapsulation packet 600 towards the network address associated with the selected backup SF instance (SF-B 1.2 253).

According to embodiments of the present invention, the SFP instance identifier 623 within the SRE 620 of the received encapsulation packet 600 is left unchanged (i.e. remains set to the primary SFP instance (i.e. I=1)) even though the encapsulation packet 600 is forwarded to the backup SF instance associated with a different SFP instance (I=2). In the example of FIG. 4, the values for the source address field 614 and the destination address field 616 in the IPv6 header 610 and the information elements SRE 620 of the encapsulation packet 600 conveying the user packet from SF-A 1.1 231 to SF-B 1.2 253 are shown in Table 5.

TABLE 5

| source address | destination address | SRE information elements |
|---|---|---|
| SF-A1.1 | SF-B 1.2 | I = 1; (SF-C1.1, SF-B1.1, SF-A1.1); SL = 1 |

Figure 12:
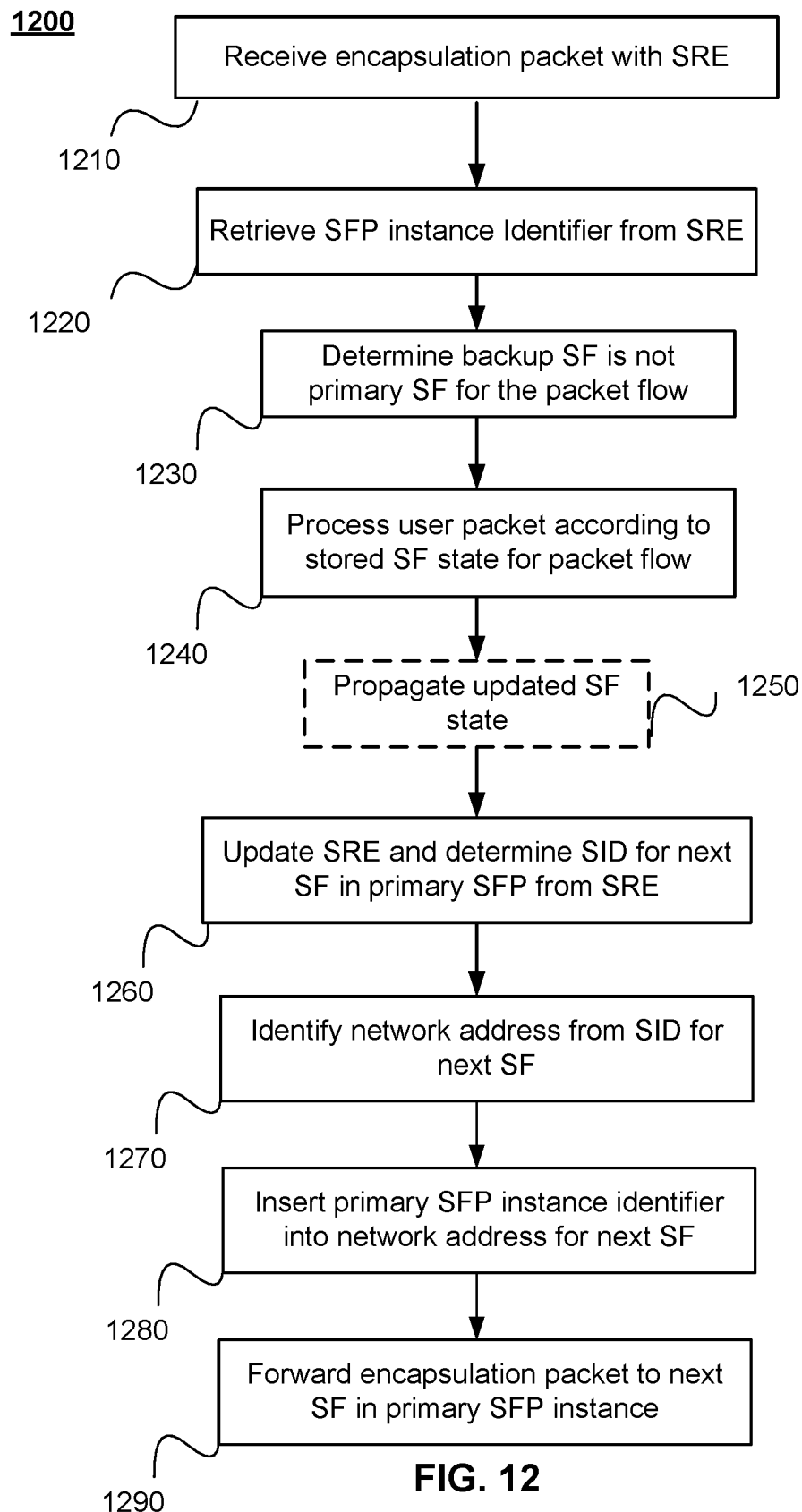
FIG. 12 illustrates processing of a redirected packet at a backup of a SF instance, according to an embodiment of the present invention

Embodiments of the present invention provide for a backup SF instance, after processing the user packet, to redirect the encapsulation packet 600 back to the primary SFP instance originally assigned to the identified packet flow by the load balancer. Following the example of FIG. 4, a route restoration function (RSF) associated with the backup SF instance (i.e. SF-B 1.2 253 in SFP instance 250 (I=2)) may forward the encapsulation packet 600 to the next SF of the primary SFP instance (i.e. SF-C 1.1 235 in SFP instance 230 (I=1)). FIG. 12 illustrates such operation 1200 of a backup SF instance (e.g. SF-B 1.2 253) after receiving an encapsulation packet 600 as a result of a communication failure in the path of the primary SFP. The steps of the operation 1200 are provided in this order for illustration purpose but the order could be changed or some steps performed concurrently without departing from the scope of the present invention.

At step 1210, an encapsulation packet 600 with a SRE 620 is received at a backup SF instance (e.g. SF-B1.2 253 in SFP instance 250 (b=2)). At step 1220, the backup SF instance retrieves the SFP instance identifier 623 (I) from the SRE 620 of the encapsulation packet 600. At step 1230, the backup SF instance determines that the SFP instance identifier (I) does not match the SFP instance (b) of the backup SF instance (i.e. I≠b).

At step 1240, the backup SF instance (SF-B 1.2 253) retrieves the stored SF state associated with the primary SFP instance (I) for the identified packet flow and then further processing of the user packet in the payload 630 of the encapsulation packet 600 is performed according to embodiments of the present invention.

At step 1250, if the user packet processed by the backup SF instance induces a change in the packet flow-related SF state, an updated SF state or SF state change (i.e., an indication of a change to the SF state) for the identified packet flow is propagated by the backup SF instance as previously described.

At step 1260, a route restoration function (RSF), which may be affiliated with the SFN 140 or SFF 130 associated with the backup SF instance, updates the "segments left" field 621 of the SRE 620 and determines the SID of the next SF to receive the encapsulation packet 600 based on the segment list 625 as described above.

At step 1270, the network address associated with the SID of the next SF instance is determined based on whether the SID is a structured IPv6 address 640 or a compact SID 650 as described above.

Because the backup SF instance is associated with an SFP instance (b) that is different from the primary SFP instance (I) for the identified packet flow, the network address for the next SF instance determined in step 1270 may refer to a SF in SFP instance b. Therefore, at step 1280, the network address of the next SF instance is modified to insert the identity of the primary SFP instance (I) into the SFP instance identifier field 646 of the network address 640.

At step 1290, the network address of the next SF instance determined in step 1270 is inserted into the destination address field 616 of the encapsulation packet 600 and the encapsulation packet 600 is forwarded towards the next SF in the primary SFP instance (SF-C 1.1 235) thus restoring the encapsulated packet 600 to the primary SFP instance associated with the identified packet flow for subsequent processing. In the example of FIG. 4, the values of the source address field 614 and the destination address field 616 in the IPv6 header 610 and the information elements in the SRE 620 of the encapsulation packet are shown in Table 6.

TABLE 6

| source address | destination address | SRE information elements |
|---|---|---|
| SF-B 1.2 | SF-C 1.1 | I = 1; (SF-C1.1, SF-B1.1, SF-A1.1); SL = 0 |

Figure 13:
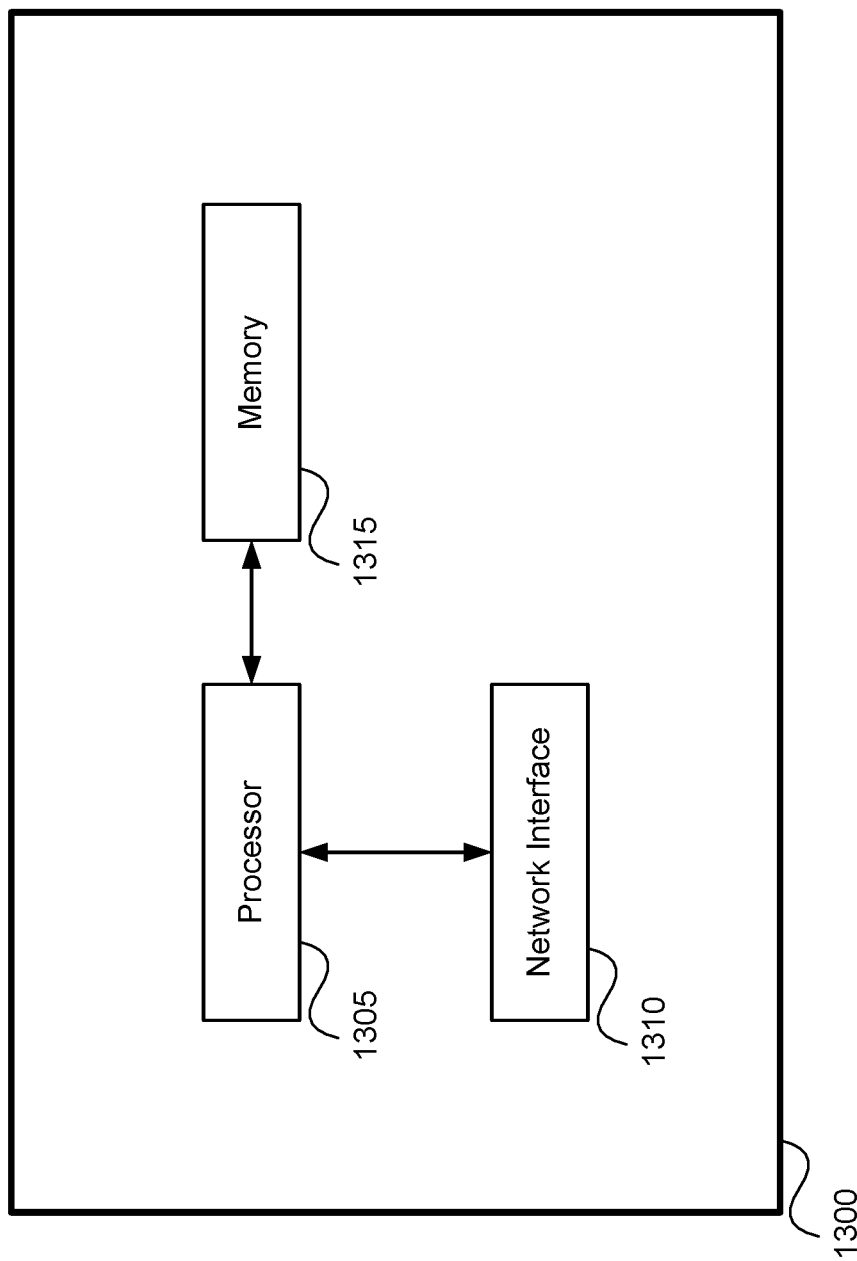
FIG. 13 illustrates a network device provided in accordance with an embodiment of the present invention.

Having reference to FIG. 13, embodiments of the present invention provide for a network device 1300, such as a network device configured to operate as a classifier, ingress node 115, load balancer, service function node, service function forwarder or service function. The network device 1300 includes a processor 1305, a network interface 1310 and a memory 1315 capable of storing at least program instructions for execution by the processor 1305. The network device 1300 may optionally be provided using network function virtualization or similar techniques. The network device 1300 can be provided as a single integral physical device or as a single integral virtual device using different physical resources such as resources in a data network, in a data center, by a network service provider, or a combination thereof. The network device 1300 is configured to transmit and receive user packets using the network interface. The network device 1300 is configured to operate on the user packets using the processor and/or memory, for example to encapsulate a user packet in an encapsulation packet, to operate on data in an encapsulation packet header, modify or replace data in an encapsulation packet header, and/or operate on a payload of an encapsulation packet.

The above-described operation of the network device may be performed by one or more functional modules, which include at least the processor, network interface and memory operating in concert in a particular manner.

Various methods as disclosed herein may be implemented on one or more real or virtual computing devices, such as devices within a communication network control plane, devices operating in a communication network data plane, or a combination thereof. Computing devices used to implement operations as described herein may include a processor operatively coupled to memory, the memory providing instructions for execution by the processor to perform a method as described herein.

Various embodiments of the present invention utilize real and/or virtual computer resources. Such computer resources utilize, at a hardware level, a set of one or more processors operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources and memory, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for processing a packet flow in a service function path (SFP), the method comprising:
   receiving, by a network function, a first packet in the packet flow, the first packet including an indication identifying a primary SFP instance assigned to the packet flow, wherein the network function is associated with the primary SFP instance in a set of SFP instances;
   updating, by the network function, a packet flow-related service function (SF) state associated with the packet flow according to the first packet;
   determining, by the network function, a backup network function, the network function and the backup network function communicatively coupled to synchronize the packet flow-related SF state, the backup network function associated with a second SFP instance in the set of SFP instances, wherein the second SFP instance is determined based on the indication identifying the primary SFP instance for the packet flow; and
   sending, by the network function to the backup network function, a state update message comprising the packet flow-related SF state associated with the packet flow, wherein the state update message is transmitted in a state update packet, the state update packet including an indication of a number of instances in the set of SFP instances, an indication identifying the primary SFP instance associated with the network function, an indication identifying the second SFP instance associated with the backup network function, a unicast source address associated with the network function, and a unicast destination address associated with the backup network function, the destination address derived from the indication identifying the second SFP instance associated with the backup network function.

2. The method of claim 1, further comprising:
   starting, by the network function, a timer; and
   receiving, by the network function, before expiry of the timer, a copy of the state update packet, wherein the destination address associated with the copy of the state update packet is a unicast address including the SFP instance associated with the network function.

3. The method of claim 2, wherein the copy of the state update packet is received by the network function due to forwarding of the state update message between members of an SF instance set, the SF instance set comprising at least the network function and the backup network function, wherein each member of the SF instance set is configured to forward a copy of the state update packet to a designated next member of the SF instance set, each member of the SF instance set associated with a different SFP instance in the set of SFP instances.

4. The method of claim 1, wherein the indication of the number of instances in the set of SFP instances is included in a segment routing extension (SRE) associated with the first packet.

5. The method of claim 1, wherein the state update message is transmitted in a state update packet wherein the destination address of the state update packet is a multicast address associated with one or more backup network functions, where each of the one or more backup network functions is associated with a different SFP instance in the set of SFP instances.

6. The method of claim 1 further comprising:
   receiving, by the backup network function, a second packet in the packet flow, the second packet including the indication identifying the primary SFP instance assigned to the packet flow and a destination address including an indication identifying the second SFP instance associated with the backup network function; and
   transmitting, by the backup network function, following processing of the second packet, the second packet toward a subsequent network function associated with the primary SFP instance according to the indication in the second packet identifying the primary SFP instance for the packet flow.

7. The method of claim 6, wherein the second packet in the packet flow is received by the backup network function following a failure in the primary SFP instance path to the network function.

8. The method of claim 1, wherein the indication identifying the primary SFP instance is included in a segment routing extension (SRE) associated with the first packets.

9. The method of claim 8, wherein the segment routing extension further comprises a segment list wherein the segment list comprises a list of segment identifiers (SIDs), each SID associated with a different respective one of a plurality of service functions forming the SFP in the primary SFP instance.

10. The method of claim 9, wherein each SID is an Internet Protocol (IP) address and the IP address includes the indication identifying the primary SFP instance.

11. The method of claim 1, further comprising:
receiving, by the backup network function, a second packet in the packet flow, the second packet including the indication identifying the primary SFP instance assigned to the packet flow in the set of SFP instances;
updating, by the backup network function, the packet flow-related SF state associated with the packet flow according to the second packet in the packet flow; and
transmitting, by the backup network function, towards another backup network function associated with another SFP instance in the set of SFP instances, a second state update packet comprising the updated packet flow-related SF state associated with the packet flow.

12. A network node comprising:
a network interface;
a processor; and
a non-transitory memory storing instructions that when executed by the processor cause the network node to:
receive, using the network interface, a first packet associated with a packet flow, the first packet including an indication identifying a primary service function path (SFP) instance assigned to the packet flow, wherein the network node is associated with the primary SFP instance;
update, according to the first packet, a packet flow-related service function (SF) state associated with the packet flow;
construct a state update packet comprising the updated packet flow-related SF state, the state update packet including the indication identifying the primary SFP instance for the packet flow;
insert, into the destination address of the state update packet, a unicast network address associated with a backup network node configured as backup to the network node, the unicast network address including an indication identifying a backup SFP instance for the packet flow; and
transmit, using the network interface, the state update packet to the backup network node.

13. A network node comprising:
a network interface;
a processor; and
a non-transitory memory storing instructions that when executed by the processor cause the network node to:
receive, using the network interface, a state update packet comprising a packet flow-related service function (SF) state associated with a packet flow, the state update packet including an indication of the number of SFP instances in a set of SFP instances and an indication identifying a primary service function path (SFP) instance in the set of SFP instances associated with the packet flow wherein the network node forms part of a second SFP instance other than the primary SFP instance in the set of SFP instances associated with the packet flow;
receive, using the network interface, a packet associated with the packet flow, the packet including the indication identifying the primary SFP instance in the set of SFP instances associated with the packet flow and a destination address identifying the second SFP instance associated with the network node;
process the packet according to the packet flow-related SF state associated with the packet flow;
transmit, using the network interface, the packet toward a further network node;
update, according to the packet, the packet flow-related SF state associated with the packet flow;
construct a second state update packet comprising the updated packet flow-related SF state, the second state update packet including the indication identifying the primary SFP instance for the packet flow and the indication of the number of SFP instances in the set of SFP instances;
insert, into the destination address of the second state update packet, a unicast network address associated with another backup network node configured as backup to the primary SFP instance for the packet flow, the unicast network address including an indication identifying another SFP instance for the packet flow which is different from the second SFP instance; and
transmit, using the network interface, the second state update packet to the other backup network node.

14. The network node of claim 13, wherein the further network node is associated with the primary SFP instance indicated in the packet.

15. The network node of claim 13 wherein the packet associated with the packet flow is received by the network function following a failure in the primary SFP instance.

* * * * *